United States Patent
Gulbrandsen

(10) Patent No.: US 10,893,035 B2
(45) Date of Patent: Jan. 12, 2021

(54) NETWORK ARCHITECTURE FOR CONTROLLING DATA SIGNALLING

(71) Applicant: Wire I.P. Limited, Dublin (IE)

(72) Inventor: Magnus Skraastad Gulbrandsen, Oslo (NO)

(73) Assignee: Wire I.P. Limited, Dublin (IE)

( * ) Notice: Subject to any disclaimer, the term of this patent is extended or adjusted under 35 U.S.C. 154(b) by 47 days.

(21) Appl. No.: 15/778,609

(22) PCT Filed: Nov. 24, 2016

(86) PCT No.: PCT/EP2016/078710
§ 371 (c)(1),
(2) Date: May 23, 2018

(87) PCT Pub. No.: WO2017/089481
PCT Pub. Date: Jun. 1, 2017

(65) Prior Publication Data
US 2018/0288027 A1    Oct. 4, 2018

Related U.S. Application Data

(60) Provisional application No. 62/260,016, filed on Nov. 25, 2015.

(30) Foreign Application Priority Data

Nov. 25, 2015  (EP) ..................................... 15196378

(51) Int. Cl.
*H04L 29/06*    (2006.01)
*G06F 21/10*    (2013.01)
*G06Q 20/38*    (2012.01)

(52) U.S. Cl.
CPC ............. *H04L 63/08* (2013.01); *G06F 21/10* (2013.01); *G06Q 20/3821* (2013.01); *H04L 63/10* (2013.01); *H04L 63/102* (2013.01)

(58) Field of Classification Search
None
See application file for complete search history.

(56) References Cited

U.S. PATENT DOCUMENTS 6,088,451 A * 7/2000 He ........................ H04L 63/20
                                                                  380/255
9,064,093 B1 * 6/2015 Felske ..................... G06F 21/00
(Continued)

FOREIGN PATENT DOCUMENTS

WO    WO 2013/105863 A1    7/2013

OTHER PUBLICATIONS

International Search Report and Written Opinion for International Application No. PCT/EP2016/078710 dated Mar. 10, 2017, in 13 pages.

*Primary Examiner* — Taghi T Arani
*Assistant Examiner* — Joshua Raymond White
(74) *Attorney, Agent, or Firm* — Knobbe, Martens, Olson & Bear, LLP

(57) ABSTRACT

A method and system are disclosed in a network for controlling data signalling therein. A core network includes at least a first node storing a contents parameters database. A sub-network operably interfaced with the core network includes at least a network transaction processing node. The first node and the network transaction processing node are each adapted to authenticate all users of data processing terminals connected to the network for access to the network or predetermined parts of the network and to monitor respective network signals of same for contents data encoded therein. An information exchange server is also operably interfaced with the sub-network and stores a registration and communication database having respective unique identifier(s) of each of the one or more network users recorded therein. One or more contents server are also operably interfaced with the sub-network and store contents (Continued)

data recorded in the contents parameters database, wherein the or each contents server is adapted to distribute contents data to network-connected terminals. Access by the terminals to the contents data and network data signalling associated therewith is controlled by the first node or the network transaction processing node according to predetermined criteria recorded in the registration and communication database, wherein the predetermined criteria is updateable by each of the first node, the network transaction processing node and the information exchange server.

11 Claims, 13 Drawing Sheets

(56) References Cited

U.S. PATENT DOCUMENTS

| | | | | |
|---|---|---|---|---|
| 2003/0037010 A1* | 2/2003 | Schmelzer | ........... | G06Q 50/184 |
| | | | | 705/67 |
| 2004/0030615 A1* | 2/2004 | Ling | ............... | G06Q 30/02 |
| | | | | 705/14.73 |
| 2006/0242038 A1* | 10/2006 | Giudilli | ............. | G06Q 20/1235 |
| | | | | 705/35 |
| 2010/0138543 A1* | 6/2010 | Loman | ............. | G06F 16/90335 |
| | | | | 709/227 |
| 2015/0081427 A1* | 3/2015 | Burke, II | ........... | G06Q 30/0251 |
| | | | | 705/14.49 |

* cited by examiner

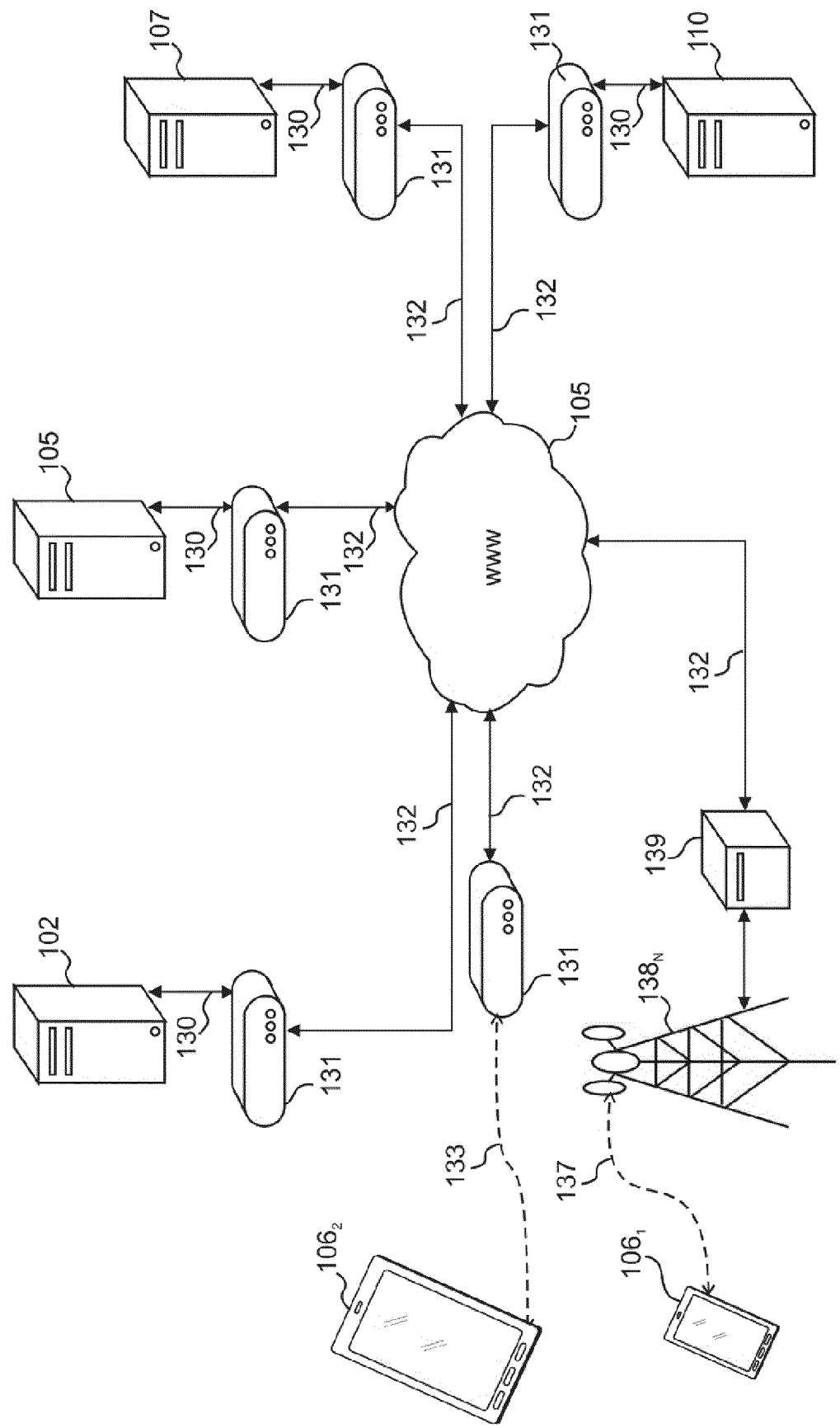

NETWORK ARCHITECTURE FOR CONTROLLING DATA SIGNALLING

FIELD

The present invention relates to network architectures and the control of data access and signalling therein. More particularly, the present invention relates to a network architecture for wide area networks in which user terminals and other connected devices access data conditionally upon authentication.

Background

Technical developments are ongoing in the electronic payments industry towards facilitating and securing electronic transaction processing in wide area data networks (WAN) such as the Internet.

The wide variety and independence of types, operating systems, physical network connectivity means and geographical locations of user terminals that may connect to the Internet at any time for accessing goods, services and other contents data of remote providers drives a global, real-time and ceaseless exchanging context. Nowadays, a same user may access a same website across the Internet through a very wide variety of terminal types owned by that user, be it a desktop computer, a tablet computer, a mobile telephone handset, a games console, a television and even, increasingly, domestic appliance such as fridges, each with its own hardware configuration, operating system and networking means, at any one time and, in the case of portable devices like the tablet computer and mobile telephone handset, wherever the user may be in the world.

However, the further evolution of that context remains hindered by the absence of a common framework or architecture associating electronic user identification with electronic user payments and associated rights, which is correspondingly network- and platform-agnostic.

On the one hand, non-technical commercial considerations result in competing distributed network accessing and transaction processing techniques that implement distinct, differing and uncoordinated systems, each requiring its own specific application programmer interface(s) and set of user registration, user identification, user authentication and/or transaction processing instructions and data.

Nowadays, each WAN user frequently requires a plurality of sets of user name, user password, and user data representative of a payment means such as a bank account or payment card, with potentially up to one set for each system or node of the network which the user wishes to, or is required to, use for accessing network connectivity in the first place (e.g. a first set of user name, password and payment data required by the user's Internet Service Provider or Mobile Telecommunications Provider for network provisioning); for accessing resources at one or more remote nodes in the network (e.g. further set(s) of user name, password and payment data required by each subscription-based website); and/or for purchasing goods, services and other contents data from remote providers at their respective provider node (e.g. further set(s) of user name, password and payment data required by each retail and/or auction website). With reference to the common variety of terminals usable by a same user, the multiplicity of authentication credentials that may have to be used on each terminal depending on the purpose of the network session compounds the difficulty of use, together with risks of accidental disclosure and criminal misappropriation described hereafter.

Other considerations which compound the problems discussed above that are still more difficult and complex, are limitations or conditions placed upon the availability of the goods, services and contents data access to users according to both non-technical criteria, such as contractual and/or jurisdictional conditions associated with the goods, services and contents data and/or the solvability of the user, and technical criteria such as the geographical location of a user at the time of access, the bandwidth of the network connection with the requesting user terminal and/or characteristics of its data processing and displaying components, and more.

On the other hand, and in the above context, networking techniques are widely misused by both unscrupulous and criminal users for accessing contents data and obtaining goods or services by deception. At the more benign end of the scale, many users enjoined from accessing remote copyright-protected contents due to jurisdictional or other contractual limitations, or simply through unwillingness to acquit relevant payments, are known to use proxy servers misrepresenting the geographical location reported by their terminal by masquerading their actual network address for another, and/or using illegal file-sharing solutions such as peer-to-peer torrents and Usenet networks. At the other end of the scale, criminals actively engage in phishing, hacking and other illegal data gathering techniques against both legitimate users themselves and any and all of network access provider nodes, retail nodes and more, to obtain sets of user names, passwords and payment data with which to engage in identity theft for illegitimately ordering and obtaining goods and services. Also criminals target communication related to illegal, destructive and violent activities without compromising and/or blocking services or people using it for non-violent reasons. Overall damage caused by illegal and criminal misuse of network data as discussed above is known to account for hundreds of billions in currency every year, last estimated at some $450 billions in 2014.

Both the disparity of respective authentication data and techniques of individual network nodes and the activity on networks for illegitimate purposes cause the use of a non-trivial volume of network bandwidth at any given time. A study entitled "Sizing the Piracy Universe" by Netnames Limited in 2013 concluded that, as of January 2013, there were approximately 450 millions illegal file sharers globally, that the total bandwidth consumed by unauthorized file transfers per month in 2012 equaled 9,567 Petabytes, representing an increase of 244.9% compared to 2010 and within which an increase of 471.9% by users of illegitimate video streaming portals. The report attributed nearly a quarter of all Internet traffic to contents data piracy, trending on the increase. US Patent Publication No. US 2006/0242038 discloses a method for charging for content transmitted over a network. In this method, a gateway system performs authorization of a user's request to access chargeable contents on a server of a Contents Provider. Thus, this document only teaches a means for authorizing access to a user to content on one or more servers located on a network to which the user is already connected. Accordingly, where a user wishes to access content located on another server, this document teaches that it is necessary for the user to send a separate authorization request to the other server. Servers unrelated to the gateway system cannot be accessed or controlled. U.S. Pat. No. 9,064,093 discloses a system for detecting copyrighted content passing through a network and performing a suitable action once such content is identified. Such actions include stopping the content transmission and offering the recipient an opportunity to purchase the content. However, similar to US 2006/0242038, U.S. Pat. No. 9,064,093 only discloses how to detect unauthorized distribution of copyrighted content on a network to which a user is already connected. There is also no teaching with regard to preventing an unauthorized user from accessing the entire network. Additionally, there is no option to preset communication opportunities to and from specific access-providers, databases and users of the network, and potentially block and control access to parts of the network (connected entities such as for example access-providers, ISP's, sites, databases, countries and unique users) for anyone of the different entities connected to the network. There is also no teaching of preventing data-traffic before it is established (e.g. to prevent cyber-attacks and hacking, DDoS attacks) and no ability to differentiate the traffic based on users, access-providers and/or country. There is also no teaching of the possibility of controlling and setting criteria related to all connected entities (sites, servers, databases, access-providers, ISP's, payment operators) and users (or connected things such as for example a camera, or a heating-system in a house) regardless of their actions related to authentication (i.e to make it not possible to bypass the rules of the network) and no teaching of categorizing types of data-traffic and metadata (e.g. unauthenticated data, encrypted data, transaction data, data from a certain geography), which would enable the design of networks within a network.

There is therefore a need for a single sign on and unique authentication in relation to a user or thing's access to a network-authentication that can be used universally (for persons and things-Internet of things). A further problem is the need for friction free payment for everything connected to the network. Another problem is the need for central and easy establishment, distribution, management and control of rights across the network. There is also a need for technologically centralized management and control over the web, without compromising privacy in an un-proportioned way. There is no ability to differentiate rights, traffic, transactions based on operator, geography, unique user or other criteria and to lock out operators, users, sites/traffic from trade and access in an effective way on a network.

Accordingly, there is a clear requirement for a different network architecture apt to remedy at least some of the problems discussed above.

SUMMARY OF THE INVENTION

The present invention mitigates the fragmented authentication data and procedures inherent to the prior art techniques with a novel network architecture which implements a universal authentication system for network users, having a single authentication method performed in a coordinated manner between a control node of a core network, a network transaction processing node of a sub-network, and every node of the sub-network or other network interconnected therewith that makes goods, services and contents available on the networks to connected users.

According to an aspect of the present invention therefore, there is provided a network architecture for controlling network data signalling, comprising at least one core network having at least a first node storing a contents parameters database; at least one sub-network operably interfaced with the core network, having at least a network transaction processing node; wherein each of the first node and the network transaction processing node is adapted to authenticate all users of data processing terminals connected to the network for access to the network and to monitor respective network signals of same for contents data encoded therein; at least one information exchange server operably interfaced with the sub-network and storing a registration and communication database having respective unique identifier(s) of each of the one or more network users recorded therein; and at least one contents server operably interfaced with the sub-network and storing contents data recorded in the contents parameters database, wherein the contents server is adapted to distribute contents data to network-connected data processing terminals; wherein access by network-connected data processing terminals to the contents data and network data signalling associated therewith is controlled by the first node or the network transaction processing node according to predetermined criteria recorded in the registration and communication database; and wherein the predetermined criteria is updateable by each of the first node, the network transaction processing node and the information exchange server.

Advantageously, this approach implements a network architecture that can be easily virtualised and scaled with comparatively few physical resources, wherein the registration of user terminals at the core network node provides a unique identification, address or number or account for each terminal device under which to conveniently conduct any form of transaction, whilst the association of the unique identification with respective network signals within the network architecture permits their active and complementary monitoring and management by the two nodes which define the topology in the architecture.

In effect the invention makes the Internet a single ecosystem/platform, made up of one platform (With potential sub platforms), all access providers, all users and connected entities, all sites providing data end information, operated by an independent and centralized system of the present invention that manages rights and data, using the whole web as a platform to connect all users and identified entities (Internet of things) and all sites of the network (through all access providers) to a platform that can be accessed at a global level. The invention can be implemented in a number of modules to provide:

(A) A Central system or environment for ESTABLISHING RIGHTS (for all conditions-to set a specific framework and conditions for actions for a given UU/Unique entity on the network)

(B) EXECUTING these conditions throughout the network (shutting out, or letting in the different elements-access providers, Users, Sites/content/traffic/apps) and also acting as the information exchange on the activities.

(C) And manage the network activities CENTRALIZED (platform that can receive info from all sources (Payment operators, banks, operators, sites)- to register, analyze and single out specific problems (a unique user, sites, traffic) and/or activities not inline with the established rights and execute proper restrictions effectively). Also send information on recorded activities.

It will be appreciated that the invention can be configured to differentiate prices and conditions in different markets for digital rights and between different Users without being bypassed (determining the location of a user for transactions and access) divide authentication and transaction (universal access-provider/platform-authentication that can be used for every transaction and action on the web (and physical-in store) supported by different Payment Operators/banks).

It will be appreciated that the invention can be configured to differentiate prices and conditions in different markets for digital rights and between different Users without being bypassed (determining the location of a user for transactions and access) divide authentication and transaction (universal access-provider/platform-authentication that can be used for every transaction and action on the web (and physical-in store) supported by different Payment Operators/banks).

In an embodiment of the network architecture, the contents parameters database may store data representative of the contents data stored at the or each contents server, data representative of a value of the contents data, the predetermined access criteria received from the or each information exchange server and the unique identifier(s) of the or each network user.

In a variant of this embodiment, the first node may be adapted to communicate at least the data representative of the contents data and the data representative of a value of the contents data to the or each network user in a user interface for effecting one or more selections.

In an embodiment of the network architecture, the first node may be adapted to detect contents data in network signals of data processing terminals connected to the network operated without authentication and to interrupt the detected network traffic. In an alternative embodiment, the network transaction processing node may be adapted to detect contents data in network signals of data processing terminals connected to the network operated without authentication and to interrupt the detected network traffic.

An embodiment of the network architecture may comprise at least one payment node connected to the sub-network, which is adapted to check for user authentication with at least the first node and to register and process electronic payments according to the authentication.

In an embodiment of the network architecture, the information exchange server may be adapted to receive data representative of the contents data, data representative of a value of the contents data and the predetermined access criteria from the or each contents server, to receive the unique identifier(s) from each network user and to send data representative of network transactions from the network transaction processing node. In an embodiment each of the first node and the network transaction processing node is adapted to authenticate all users of data processing terminals connected to the network for access to the network or predetermined parts of the network.

For the economy of hardware components and associated resources, the network architecture of the invention and any of the above embodiments may be virtualized, wherein at least the first node, the network transaction processing node and the information exchange server are combined into a single network resource.

According to another aspect of the present invention, there is also provided a method of controlling network data signalling in a network, wherein the network comprises the above integers of at least one core network having at least a first node, at least one sub-network operably interfaced with the core network, having at least a network transaction processing node, and at least one information exchange server and at least one contents server each operably interfaced with the sub-network, the method comprising the steps of storing a contents parameters database at the first node; authenticating all users of data processing terminals connected to the network with the first node and the network transaction processing node for access to the network; monitoring respective network signals of data processing terminals connected to the network for contents data encoded therein; storing a registration and communication database having respective unique identifier(s) of each of the one or more network users recorded therein at the information exchange server; storing contents data recorded in the contents parameters database at the contents server and distributing same to network-connected data processing terminals therewith; controlling accessing of the contents data by network-connected data processing terminals to network data signalling associated therewith with the first node or the network transaction processing node according to predetermined criteria recorded in the registration and communication database; and updating the predetermined criteria by each of the first node, the network transaction processing node and the information exchange server.

An embodiment of the method may comprise the further step of storing data representative of the contents data stored at the or each contents server, data representative of a value of the contents data, the predetermined access criteria received from the or each information exchange server and the unique identifier(s) of the or each network user in the contents parameters database.

A variant of this embodiment may comprise the further step of communicating at least the data representative of the contents data and the data representative of a value of the contents data with the first node to the or each networked user terminal in a user interface for effecting one or more selections.

An embodiment of the method may comprise the further steps of detecting contents data in network signals of data processing terminals connected to the network operated without authentication and interrupting the detected network traffic. The steps of detecting and interrupting may be performed by the first node, by the network transaction processing node or by both nodes in cooperation.

In an embodiment of the network architecture wherein the at least one sub-network further comprises at least one payment node, the method may comprise the further steps of checking for user authentication with the first node and registering and processing electronic payments according to the authentication with the payment node.

An embodiment of the method may comprise the further step of, at the information exchange server, receiving data representative of the contents data, data representative of a value of the contents data and the predetermined access criteria from the or each contents server, receiving the unique identifier(s) from each network user and sending data representative of network transactions from the network transaction processing node. An embodiment may further comprise authenticating all users of data processing terminals connected to the network with the first node and the network transaction processing node for access to the network or predetermined parts of the network. According to another aspect of the present invention, there is also provided a network architecture for controlling network data signalling, comprising at least one core network having at least a first node storing a contents parameters database; at least one sub-network operably interfaced with the core network, having at least a network transaction processing node; wherein each of the first node and the network transaction processing node is adapted to authenticate users of data processing terminals connected to the network and to monitor respective network signals of same for contents data encoded therein; at least one information exchange server operably interfaced with the sub-network and storing a registration and communication database having respective unique identifier(s) of one or more network user recorded therein; and at least one contents server operably interfaced with the sub-network and storing contents data recorded in the contents parameters database, wherein the contents server is adapted to distribute contents data to network-connected data processing terminals; wherein access by network-connected data processing terminals to the contents data and network data signalling associated therewith is controlled by the first node or the network transaction processing node according to predetermined criteria recorded in the registration and communication database; and wherein the predetermined criteria is updateable by each of the first node, the network transaction processing node and the information exchange server. According to another aspect of the present invention there is also provided a method of controlling network data signalling in a network, wherein the network comprises the above integers of at least one core network having at least a first node, at least one sub-network operably interfaced with the core network, having at least a network transaction processing node, and at least one information exchange server and at least one contents server each operably interfaced with the sub-network, the method comprising the steps of storing a contents parameters database at the first node; authenticating users of data processing terminals connected to the network with the first node and the network transaction processing node; monitoring respective network signals of data processing terminals connected to the network for contents data encoded therein; storing a registration and communication database having respective unique identifier(s) of one or more network users recorded therein at the information exchange server; storing contents data recorded in the contents parameters database at the contents server and distributing same to network-connected data processing terminals therewith; controlling accessing of the contents data by network-connected data processing terminals to network data signalling associated therewith with the first node or the network transaction processing node according to predetermined criteria recorded in the registration and communication database; and updating the predetermined criteria by each of the first node, the network transaction processing node and the information exchange server.

For any of the above embodiments of the system and the method of the invention, any of the first node, the network transaction processing node, the information and exchange server, the contents server, the payment node and the networked user terminals may be one or more selected from the group comprising desktop computers, mobile telephone handsets, tablet computers, portable computers, personal digital assistants, portable media players, portable game consoles.

In an embodiment there is provided a module to establish or register rights in a platform. For example, in one flow registration of sites+access-providers+Register rights/conditions for use and activities receiving and sending info with, and executing through one or more Core networks. All conditions can be set, but examples of conditions are: Prices, payment methods, ratio of payment to different players, specify different conditions in different markets, differentiate users, business-model. If user access this site or engages in this activity online—no access to another specified site/activity (eg. competitors, illegal). Geolocation can be a condition. Ways of determining geolocation of a user: access-providers geo-location, device location/network detection, GPS→New dimension using geography to create digital layers of "reality" (which can provide a platform for augmented reality) Conditions can be set to a single UU or groups of UU—can be shut out or let in and given access upon payment, nationality, company, age, right to vote. Characteristics of a Unique user can be registered in the platform's UU—account and executed on the UU by access-provider or the platform with the CN//other criteria: use of specific Payment Operator, access through specific application, specific Site.

It will be appreciated that all access opportunities and pricelists is provisioned in a system with a user-interface that the connected users can choose from.

In an embodiment there is provided a module to register Unique identifications for a user and other connected unique entities (all users/entities with access to network can have an id registered) and info related to the UU and its transactions and action history and current access rights in an USER-ACCOUNT (e.g. like nation, operator, company, current access rights to sites,) Live update/real-time on conditions (e.g. moving geographically, Changing status or moving digitally-entering a specific app) Change of status can be sent to the central platform and updated and further signal the new status to relevant sites/operators. Can be locked out if UU no longer are in line with conditions.

It will be appreciated that the invention can provide universal authentication-method for every user or thing/entity (Internet of things) and for every situation where authentication is needed (Device neutral: TV, mobile, watch, screen/Platform neutral: ecosystems, operators, payment operators, banks, card, terminals, physical goods, payment in store, payment online/Action neutral: payment, signing, voting ect/Geography neutral) The user can be a person, thing, company, organization, government or other entity.

In an embodiment there is provided a module for controlling/execution of those rights and data using a number of routines (A) pre-registered framework (in platform, in access databases protecting sites/content, in Core-network functions for monitoring and termination- receive update when a access status changes) (B) live monitoring, controlling, securing and termination of traffic by CN (traffic filter/DPI)→Lockout of UU that is changing status, condition no longer in line with access condition-REAL TIME TERMINATION (not supposed to have access? Not paid for access? Piracy? Not authenticated?) Know administrative/manually or through registered rights in platform what traffic/content, sites, not to be allowed. (C) Platform can register and analyze all info of the actions on a network: the transaction records, all authenticated traffic, bandwidth usage, traffic and file recognition, geography of activity, users and devices, unauthenticated use of unregistered or free accessible sites and content and e.g if unauthenticated traffic shall be blocked.

In an embodiment there is provided a lock out/blocking of one or all Accessprovider(s)/operator(s) (automatic LOCK-OUT/blocking and also ADDING/registering NEW Access-providers/OPERATORS, SITES AND USERS-Access provider/operator or site must register in platform/system of the present invention to have access). Access provider/operator can be controlled (e.g. if operator do not implement, not a part of the system of the present invention comply and effectuate rights, do not block a user that should be locked out, not in right Geo-location, have a UU that do not comply, failed payment Then the unique identifier of the operator and/or their users will be deleted from the access-database (RD) that is protecting the rights resulting in denied access for the operator and their users). If Unique User not in line with conditions e.g. payment, geography, other changed status terminated access by Access provider or locked out by deleting UU in a RD or removing their access rights through the centralized platform.

In an embodiment there is provided a module for sites/right holders ect not being a part of the service-offering to the costumer (eg if not a part of the system of the present invention, not comply with conditions ect)→Blocking the sites/URL in network and termination of/down prioritize traffic of the site/content/rights and making the site unavailable for the UU of the network and/or the access-provider, Platform remove the UU in the RD of the site or remove rights for the UU in the platform.

Content, traffic, applications can be controlled (illegal and LEGAL and "invisible data"/secure/encrypted data can be blocked—e.g. if contractual issues regarding the rights is not settled). Other condition such as lock out country's (e.g all its operators, users) can also be implemented.

It will be appreciated that implementing of new access providers/UU is done by registering it and/or its UU in the RD(the access database protecting a site/data) and further in the platform, or in the platform and then in the RD or to the operator/access provider that can offer access to the site to their customers and bill accordingly and register in RD. Or from the operator/access provider to the platform and further to the RD. The sites can register in the platform and the platform can provide info to all the operators that can offer it to their UU.

The system is configures not just to control access for a UU to different rights, content and data but for access to the whole system for operators and its users, and for sites and its content/rights (Platform lockout/blocking of site, operator/accessprovder, Unique User//Site lockout/blocking of operator/access provider, UU//Operator/access provider lockout/blocking of site/traffic/data/content, UU)

It will be appreciated that Lock Out/blocking (e.g. because of illegal/not in line with rights and conditions, site that is not a part of the system, operator that is not a part of the system) can be implemented in a number of ways:

Blocking/terminating traffic in network by monitoring/filtering/file-recognition or shut down a specified traffic type, E.g. all un-authorized traffic in a network, or to a geographic position, to a UU or to a device: Limit and target search for, and termination of piracy, Hacking activity, virus, and communication regarding terror and other illegal crime. Can monitior un-authenticated traffic and only filter and detect the pre-registered files, rights and traffic indicators, not the other traffic. Can lockout/block a single user, a single geography to prevent e.g locking out a whole application/site ect Source blocking: DNS blocking, link blocking.

UU blocking (if the criteria for access is not present, the access is terminated, or the network access is terminated if UU is not authenticated).

It will be appreciated that registration can take place on a Centralized platform and info exchange (registration and overview of network activity in a needed way (eg to single out and target activity attached to hacking, virus, terror communication, other illegal—easy to single out eg the "Dark web" by receiving info on the legal side of the web): transactions (across payment means: Payment Operator, Bank, Sites), actions, rights and traffic/data registered from all sources, ecosystems and payment means in one place. Registering this information centrally and sending it on to relevant players will benefit users, access providers and right holders.

By centralizing the registration and management of rights on one platform means the system can communicate products, prices, and different conditions to different markets through one platform, Stop illegal use and bypassing of rights and less signalling in the network by having a central. By having one centralized UU account in platform: If UU change access-provider, move to another country- the rights follow the UU, let user control its own user info. Centralized and standardized prices and conditions transparent for all involved parties (securing right ratio to the different involved players).

It will be appreciated that the operator/access-provider can communicate with the platform system centrally and platform can inform the other access providers of the network to execute a collaborative effort to shut down and block specific traffic, activities, sites, UU, let only authenticated traffic flow or terminate network access to un-authenticated users.

It will be appreciated that the operator/access-provider can communicate with the platform system centrally and platform can inform the other access providers of the network to execute a collaborative effort to shut down and block specific traffic, activities, sites, UU, let only authenticated traffic flow or terminate network access to un-authenticated users.

Other aspects of the invention are as set out in the appended claims.

BRIEF DESCRIPTION OF THE DRAWINGS

The invention will be more clearly understood from the following description of an embodiment thereof, given by way of example only, with reference to the accompanying drawings, in which:

FIG. 1B illustrates an example implementation of the network architecture of FIG. 1A including a core network server, network transaction processing server, information exchange server, contents server and two connected user terminals.

DETAILED DESCRIPTION OF THE DRAWINGS

Figure 1A:
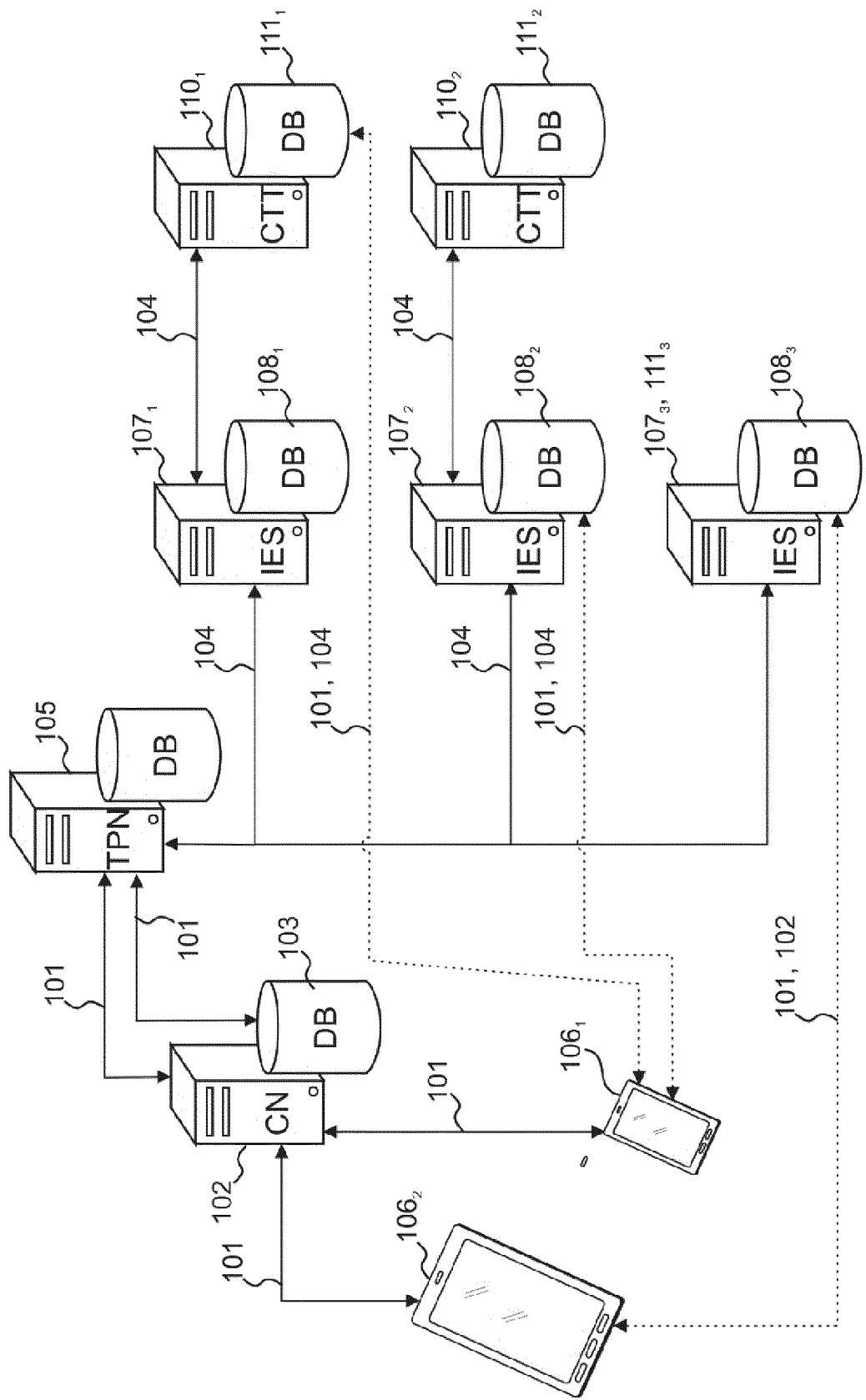
FIG. 1A is a logic representation of a network architecture according to a first embodiment of the present invention, including a core network, a plurality of sub-networks and a variety of connected servers and user terminals.

There will now be described by way of example a specific mode contemplated by the inventors. In the following description numerous specific details are set forth in order to provide a thorough understanding, wherein like reference numerals designate like components and features. It will be apparent to one skilled in the art however, that the present invention may be practiced without limitation to these specific details. In other instances, well known methods and structures have not been described in detail so as not to unnecessarily obscure the description.

The words "comprises/comprising" and the words "having/including" when used herein with reference to the present invention are used to specify the presence of stated features, integers, steps or components but does not preclude the presence or addition of one or more other features, integers, steps, components or groups thereof.

Referring now to the figures and initially FIGS. 1A and 1B, there is shown a network architecture 100 in which several data processing terminals are connected to a Wide Area Network (WAN) 120, in the example the Internet, through a variety of further networks wherein network connectivity and interoperable networking protocols of each terminal allow the terminals to connect to one another and to communicate data to, and receive data from, one another according to the methodology described herein.

The network architecture 100 comprises at least one core network 101 having at least a first node 102 storing a contents parameters database 103. The network architecture 100 also comprises at least one sub-network 104 operably interfaced with the core network 101, having at least a network transaction processing node 105. In the network architecture 100, each of the first node 102 and the network transaction processing node 105 is adapted to authenticate users of data processing terminals $106_N$ connected to the network and to monitor respective network signals of same for contents data encoded therein.

The core network 101 is maintained by the first node 102 which, in the example, is a personal computer terminal 102 configured as a core network server. The server 102 emits and receives data encoded as a digital signal over a wired data transmission 130, wherein said signal is relayed respectively to or from the server 102 by a local router device 131 implementing a wired local network operating according to the IEEE 802.3-2008 Gigabit Ethernet transmission protocol. The router 131 is itself connected to the WAN 120 via a conventional optical fibre connection over a wired telecommunication network 132.

In this embodiment, the sub-network 104 is maintained by the network transaction processing node 105 which, in the example, is another personal computer terminal 105 configured as a server. The network transaction processing server 105 again emits and receives data encoded as a digital signal, over a wired data transmission 130, relayed respectively to or from the server 105 by a local router device 131, itself connected to the WAN 120 via a similar high-bandwidth connection over a wired telecommunication network 132, as described hereinabove. Skilled readers will readily appreciate from the foregoing that the network transaction processing node 105 may reside at the same location as the core network server 102 and be connected to the same router 131 for onward connection to the WAN 120, or even be implemented at the core network server 102, particularly in virtualised implementations of the network architecture 100.

The network architecture 100 further comprises at least one information exchange server 107, operably interfaced with the sub-network 104 and storing a registration and communication database 108 having respective unique identifier(s) 109 of one or more network users recorded therein, and at least one contents server 110 operably interfaced with the sub-network 104 and storing contents data 111 recorded in the contents parameters database 103, wherein the contents server 110 is adapted to distribute contents data 111 to network-connected data processing terminals $105_N$.

In this embodiment, each of the information exchange server 107 and the contents server 110 is a further personal computer terminal 107, 110 emitting and receiving data encoded as a digital signal over a wired data transmission 130, relayed to or from the server 107, 110 by another, respective router device 131 connected to the WAN 120 via a high-bandwidth connection over a wired telecommunication network 132.

The information exchange server 107 may be a function-specific network server configured according to the methodology described within the architecture 100 and be distinct from the contents server 110, but skilled readers will again readily appreciate from the foregoing that the information exchange server 107 may instead be implemented at the contents server 110, or implemented in a distributed manner at each contents server 110N, connected to the network transaction processing node 105 across the WAN 120 and the sub-network 104.

A first type of user data processing terminal $106_1$ in the architecture 100 may be a mobile personal communication device operated by a user. The user terminal $106_1$ emits and receives data, including voice and/or alphanumerical data, encoded as a digital signal over a wireless data transmission 137, wherein the signal is relayed respectively to or from the device $106_1$ by the geographically-closest communication link relay 138 of a plurality thereof. The plurality of communication link relays $138_N$ allows digital signals to be routed between mobile devices like the user terminal $106_1$ and their intended recipient by means of a remote gateway 139. Gateway 139 is for instance a communication network switch, which couples digital signal traffic between wireless telecommunication networks, such as the network within which wireless data transmissions 137 take place, and the WAN 120. The gateway 139 further provides protocol conversion if required, for instance if the terminal $106_1$ uses a Wireless Application Protocol ('WAP') or Secure Hypertext Transfer Protocol ('HTTPS') to communicate data.

Another type of user data processing terminal $106_2$ in the architecture 100 may be a mobile personal computer terminal, alternatively operated by the same user of the mobile personal communication device $106_1$ or by another, and in the example is a tablet computer $106_2$. The tablet computer $106_2$ emits and receives data encoded as a digital signal over a wireless data transmission 133 conforming to the IEEE 802.11 ('Wi-Fi') standard, wherein the signal is relayed respectively to or from the tablet computer by a local router device 131 interfacing the tablet computer $106_2$ to the WAN communication network 120. The tablet computer $106_2$ further comprises a High Frequency Radio Frequency Identification (RFID) networking interface implementing Near Field Communication (NFC) interoperability and data communication protocols for facilitating wireless data communication over a short distance with correspondingly-equipped devices such as the mobile phone $106_1$ and/or an NFC-enabled device of the user, for instance an electronic payment card. The tablet computer the tablet computer $106_2$ may for instance be an iPad™ manufactured by Apple, Inc. of Cuppertino, Calif., USA or a Surface™ manufactured by Microsoft, Inc. of Redmond, Wash., USA.

Figure 2:
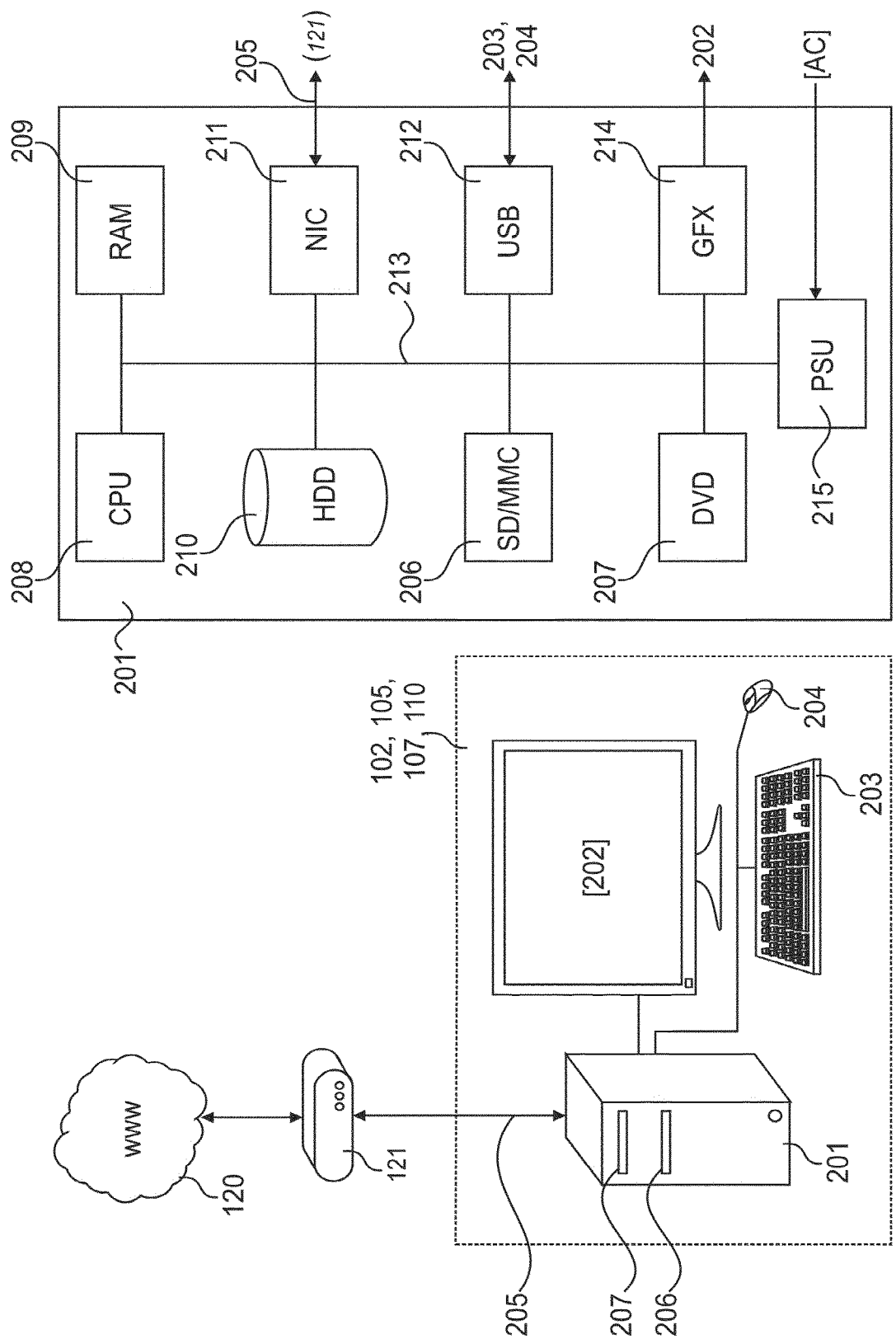
FIG. 2 illustrates a typical hardware structure of a data processing server shown in FIG. 1B, such as the core network server, network transaction processing server, information exchange server and contents server.

A typical hardware architecture of the server terminals 102, 105, 107, 110 is shown in FIG. 2 in further detail, by way of non-limitative example. As skilled persons will readily understand, the hardware architecture of the servers 102, 105, 107, 110 may be substantially identical or similar to one another, with components designed for durability and redundancy of operation, by contrast with the components of the mobile phone $106_1$ and tablet $106_2$ designed for improved portability.

Each data processing terminal 102, 105, 107, 110 is a computer configured with a data processing unit 201, data outputting means such as video display unit (VDU) 202, data inputting means such as HiD devices, commonly a keyboard 203 and a pointing device (mouse) 204, as well as the VDU 202 itself if it is a touch screen display, and data inputting/outputting means such as the wired network connection 205 to the communication network 150 via the router 120, a magnetic data-carrying medium reader/writer 206 and an optical data-carrying medium reader/writer 207.

Within data processing unit 201, a central processing unit (CPU) 208 provides task co-ordination and data processing functionality. Sets of instructions and data for the CPU 208 are stored in memory means 209 and a hard disk storage unit 210 facilitates non-volatile storage of the instructions and the data. A wireless network interface card (NIC) 211 provides the interface to the network connection 205. A universal serial bus (USB) input/output interface 212 facilitates connection to the keyboard and pointing devices 203, 204.

All of the above components are connected to a data input/output bus 213, to which the magnetic data-carrying medium reader/writer 206 and optical data-carrying medium reader/writer 207 are also connected. A video adapter 214 receives CPU instructions over the bus 213 for outputting processed data to VDU 202. All the components of data processing unit 201 are powered by a power supply unit 215, which receives electrical power from a local mains power source and transforms same according to component ratings and requirements.

Figure 3:
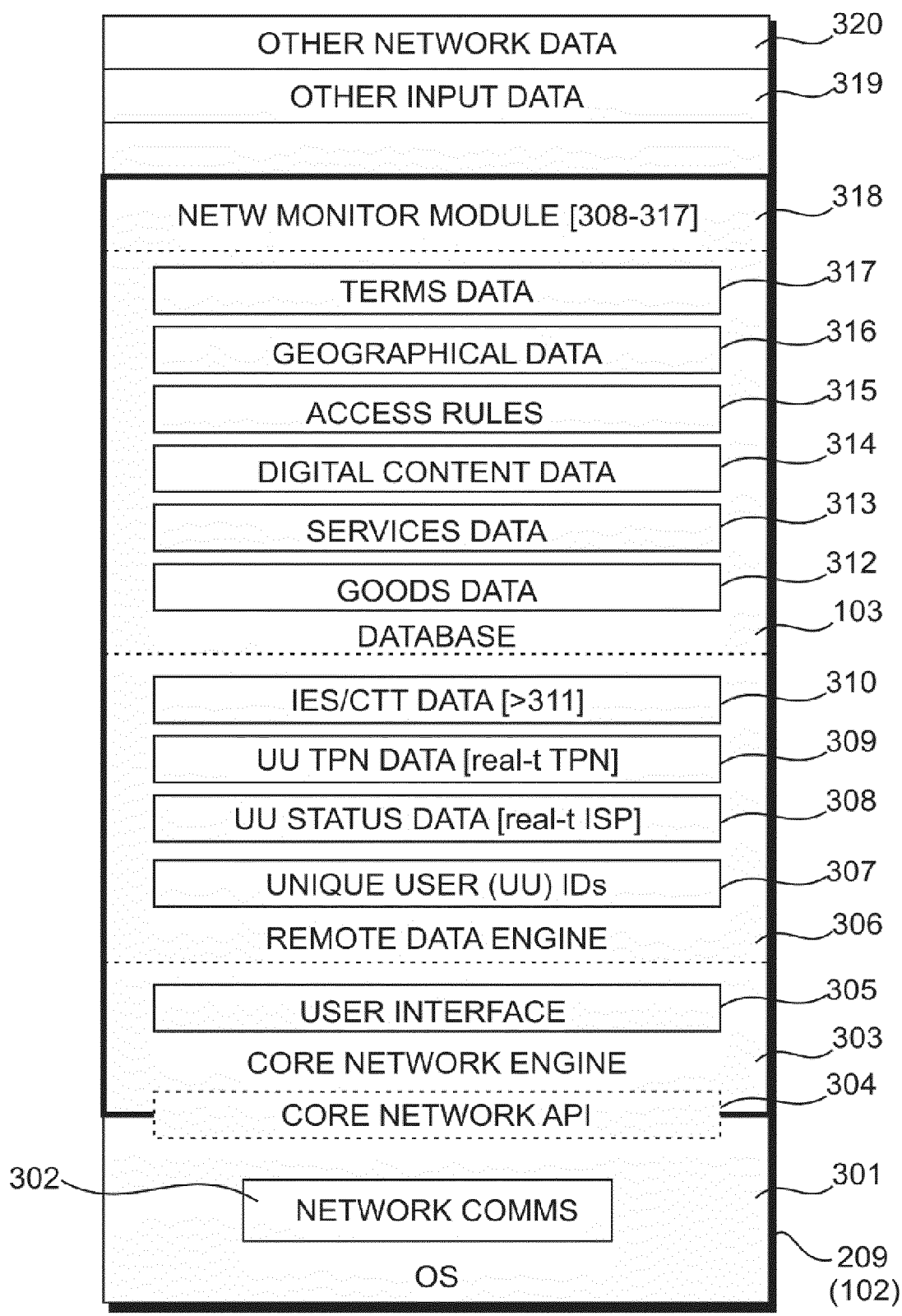
FIG. 3 illustrates the memory contents of the core network server at runtime, including an operating system, a first set of instructions and a contents parameters database.
Figure 4:
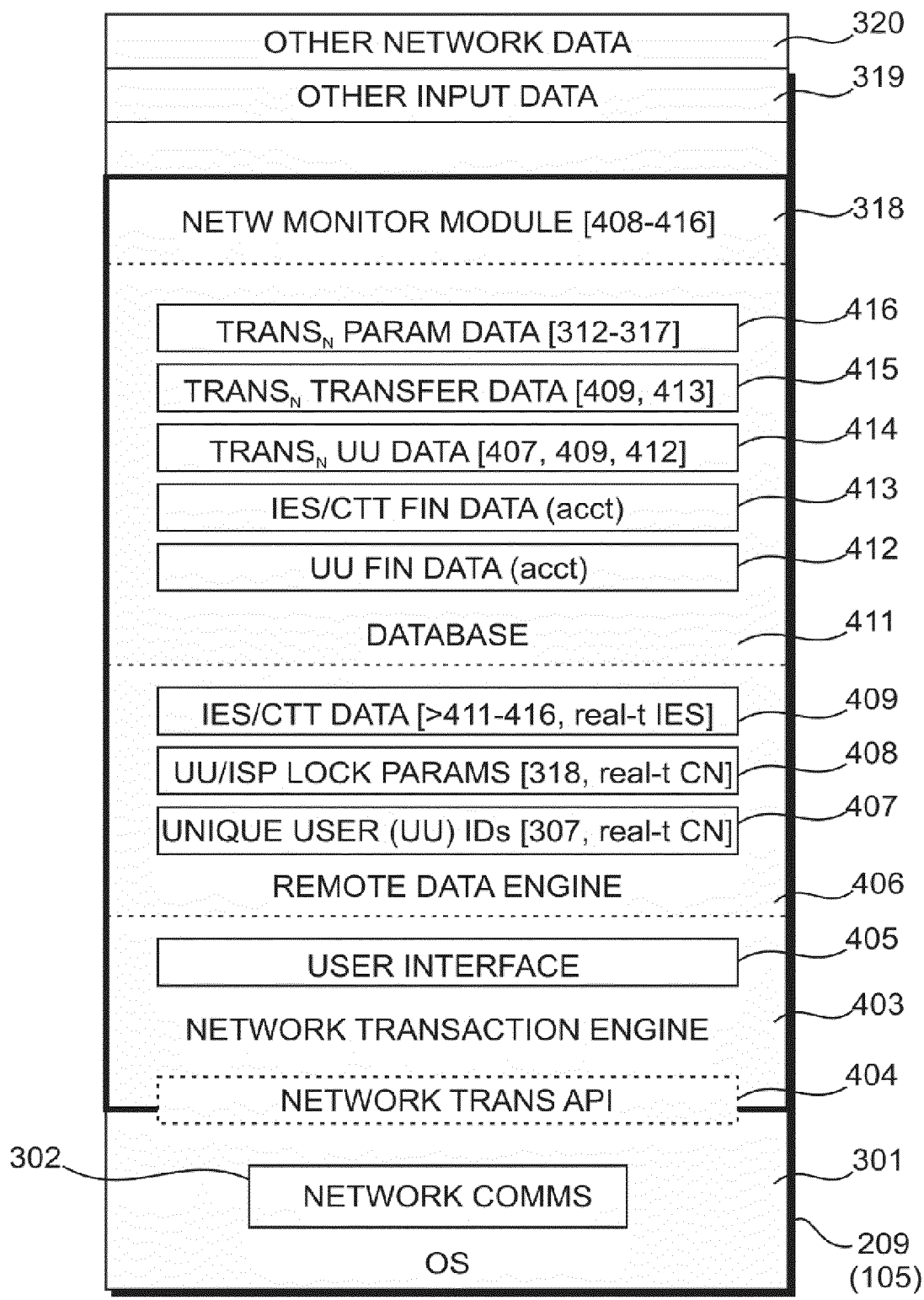
FIG. 4 illustrates the memory contents of the network transaction processing server at runtime, including an operating system, a second set of instructions and a network transaction database.
Figure 5:
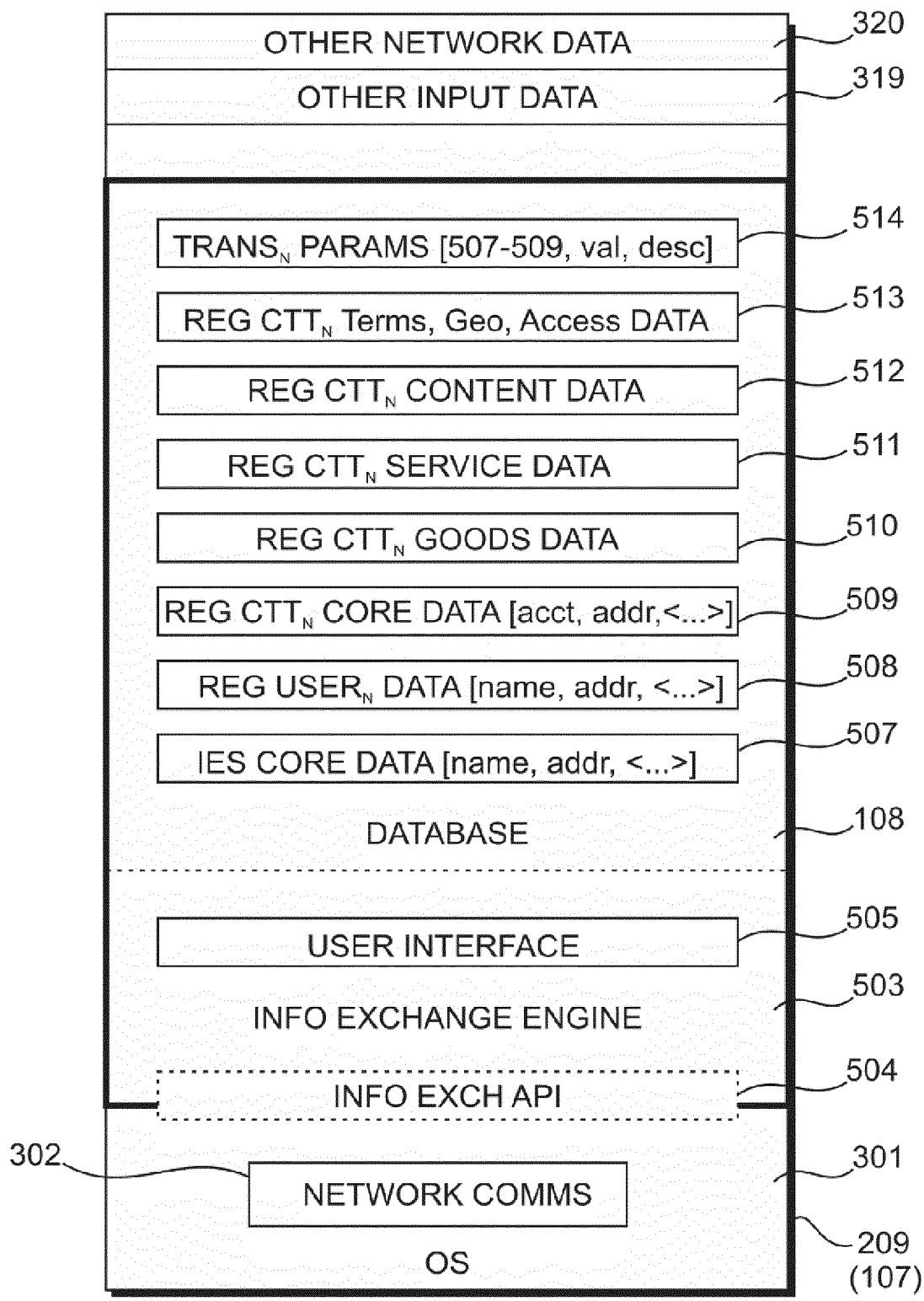
FIG. 5 illustrates the memory contents of the information exchange server at runtime, including an operating system, a third set of instructions and a registration and communication database.

With reference to FIGS. 3 to 5, wherein like reference numerals designate like components and features, an operating system is shown at 301 which, if each of the core network server 102, network transaction processing server 105 and information and exchange server(s) 107 is for instance an desktop computing device as described in FIG. 2 and manufactured e.g. by DELL® Inc. of Round Rock, Tex., USA, is Windows Server 2012 R2 distributed by Microsoft® Inc. of Redmond, Wash., USA. The OS 301 includes instructions for governing the basic data processing, interdependence and interoperability of the server hardware components e.g. as described in FIG. 2, and communication subroutines 302 to configure the server unit 201 for bilateral network communication via the NIC 211 interfaced with the wired connection 130 to the local router 131. The OS 301 also includes input subroutines for reading and processing input data variously consisting of user direct input to human interface devices, namely the keyboard 203 and computer mouse 204.

With reference to FIG. 3 now, the server 102 is configured into the core network server 102 of the architecture 100 by a set of instructions embodying a server application 303 hereinafter referred to as core network engine 303, and the contents parameters database 103 both residing in the memory 209 at runtime. The set of instructions 303 is interfaced with the OS 301 through one or more Application Programmer Interfaces (API) 304 and comprises and coordinates the data processing activity of further function-specific data processing subroutines, and a user interface 305 updated and output to the display 202 in real-time.

A first subroutine 306 is a remote data engine 306 which receives, processes, updates the database 103 with data incoming from remote nodes into and within the core network 101, particularly data communicated by the network transaction processing server 105, information and exchange server(s) 107, network access providers such as Internet Service Providers ('ISPs') and Mobile Service Providers ('MSPs') and addresses and distributes same within the sub-network 104.

Data received and processed by the remote data engine 306 includes unique user (UU) identifiers 307 of users connected to the architecture 100 through respective user terminals $106_N$; user status data 308 obtained from users' ISPs and MSPs that is representative of terminal location, connection bandwidth, user security flag and more; unique user (UU) data 309 obtained from the network transaction processing server 105 that is representative of unique user security flags, user transactions for goods, services and/or digital content and more; and definitional data 310 representative of the goods, services, digital contents and access conditions and terms for same stored at information and exchange server(s) $107_N$ and contents server 110 relayed to the core network server 102 by the network transaction processing server 105.

The core network engine 303 updates the contents of the contents parameters database 103 on the basis of the data 307-310 received and processed by the remote data engine 306. The contents of the contents parameters database 103 comprise goods data 312, services data 313 and digital content data 314 which respectively define physical goods, personal or corporate services and copyright-protected multimedia files made available by the operators of remote e-tail sites hosted by the content server 110. The contents of the database 103 further comprise access rules 315, which define technical conditions for the users of user terminals $106_N$ to obtain or peruse the goods, services and/or digital content, for instance criteria of connection bandwidth, user terminal display resolution, registration of electronic payment means; geographical data 316 which define physical locations and boundaries associated with the goods, services and/or digital content and embodying jurisdictional conditions for access thereto; and terms data 317 which define non-technical conditions for the users of user terminals $106_N$ to obtain or peruse the goods, services and/or digital content, for instance pricing, lead times, payment terms.

A second subroutine 318 is a network monitor module 318, with which the core network server 102 audits and control network signals of user terminals $106_N$ connected to the architecture 100, according to the methodology described herein. The network monitor module 318 processes sampled network signals, namely inspects the data encoded therein and compares same against the network data processed by the remote data engine 306 and the data stored in the database 103.

With reference to FIG. 4 now, the second server 105 is configured into the network transaction processing server 105 of the architecture 100 by a second set of instructions embodying a second server application 403 hereinafter referred to as network transaction engine 403, and a network transaction database 411 both residing in the memory 209 at runtime. The network transaction engine 403 is again interfaced with the OS 301 through one or more Application Programmer Interfaces (API) 404 and again comprises and coordinates the data processing activity of further function-specific data processing subroutines, and a user interface 405 updated and output to the display 202 in real-time.

A first subroutine 406 is a second remote data engine 306 which receives, processes, updates the database 411 with data incoming from remote nodes into and within the sub-network 104, particularly data communicated by the one or more information and exchange server(s) 107, contents server(s) 110, and addresses and distributes same within the sub-network 104 and to the core network server 102 within the core network 101.

Data received and processed by the second remote data engine 406 includes unique user (UU) identifiers 307 communicated by the first remote data engine 306 at the core network server 102 in real time and shown at 407; unique user (UU) lock-out parameters communicated by the network monitoring module 318 at the core network server 102 in real time and shown at 408; and both definitional data 409 representative of goods, services, digital contents, access conditions and terms for same stored at information and exchange server(s) $107_N$ and contents server 110 and transactional data representative of electronic transactions for the goods, services and/or digital content processed by the information and exchange server(s) $107_N$ and/or contents server 110 and/or for processing by the information and exchange server 105, all shown at 409. Definitional data 409 is communicated to the core network server 102, wherein it is received as 310.

The network transaction engine 403 updates the contents of the database 411 on the basis of the data 407-409 received and processed by the second remote data engine 306. The contents of the database 411 comprise the transactional portion of the communicated data 409 and accordingly comprise unique user (UU) financial data 412 such as an electronic account or electronic payment card reference; information and exchange server financial data 413, again such as an electronic account or electronic payment address; unique user (UU)-respective transactional data 414 representative of one or more electronic transactions referencing a same unique user (UU) identifier 407, the information exchange server 107 (or, alternatively, contents server 110) 409 and the account or electronic payment card reference 412; transfer-respective data 415 comprising transferred amounts data 409 and financial data 413 of the information and exchange server 107 (or, alternatively contents server 110) for each transaction; and transaction parameter data 416 comprising transacted particulars (goods, services, contents data, pricing, etc) according to definitional data stored in the database 103 maintained by the core network server 102.

A second subroutine 318 is a network monitor module 318, with which the network transaction processing server 105 audits and control network signals of user terminals $106_N$ connected to the architecture 100 in parallel with the core network server 102, according to the methodology described herein. The network monitor module 318 again processes sampled network signals, namely inspects the data encoded therein and compares same against the network data processed by the second remote data engine 406 and the data stored in the network transaction database 411.

With reference to FIG. 5 now, the third server 107 is configured into the information exchange server 107 of the architecture 100 by a third set of instructions embodying a third server application 503 hereinafter referred to as information exchange engine 503, and the registration and communication database 108 both residing in the memory 209 at runtime. The information exchange engine 503 is again interfaced with the OS 301 through one or more Application Programmer Interfaces (API) 504, and both updates the network transaction database 108 and updates and outputs a user interface 505 to the display 202 in real-time.

The information exchange engine 503 interfaces one or more contents server(s) 110 with the sub-network 104, both receiving data therefrom and communicating data thereto, and effectively bridges the one or more contents server(s) 110 with the core network server 102 and the network transaction processing server 105, allowing data from the one or more contents server(s) 110 to populate the contents parameters database 103 and the network transaction database 411 respectively stored and updated thereat.

The registration and communication database 108 accordingly comprise core registration data 507 for the information and exchange server 107 itself, including its operator name, geographical location, electronic payee and receiver accounts and more; registered user data 508 including, for each user, particulars of the user such as name, address, electronic account or electronic payment card number and more; respective core registration data 509 for each contents server 110 registered at the information and exchange server 107, including its operator name, geographical location, electronic payee and receiver accounts and more; registered goods data 510, registered services data 511 and registered digital content data 512 which respectively define physical goods, personal or corporate services and copyright-protected multimedia files made available by the operators of remote e-tail sites hosted by the registered content server(s) 110.

The contents of the database 108 further comprise data 513 representative of the respective access rules 315, geographical data 316 and terms data 317 communicated by each registered contents server 110 in respect of their goods, services and/or digital contents, whether applicable to all regardless or selectively.

The contents of the database 108 further comprise data 514 representative of electronic transactions conducted between registered users 508 and registered contents server(s) 509 for the registered goods, services and/or digital content 510, 511, 512 according to the access rules 315, geographical data 316 and terms data 317, already processed by, or for processing by, the information and exchange server(s) $107_N$ or the information and exchange server 105.

With reference to FIGS. 3 to 5 again, further local data 319 and network data 320 may be stored in the memory means 202 of each server 102, 105, 107 at runtime, some or all of which may be processed either by the server application 303, 403, 503 and sub-routines thereof, or by or for other application(s) being processed in parallel with the said server application. An example of further local data is for instance local user input 319 read by the OS 301 in real time from the HiD devices 203, 204 but which user input lies outside the user interface 305, 405, 505 of the application 303, 403, 503. An example of further network data 320 is for instance remote application or OS updating data 320 communicated by a remote server over the WAN 120.

Data processing steps of the methodology implemented across the several network nodes for controlling data signalling in the network architecture 100 at runtime are described hereafter as discrete groups of chronological data processing tasks processed within a same processing cycle, and each such succession is repeated iteratively at runtime whilst the core network server 102, the network transaction processing node 105 and the information exchange server 107 are in use. It will be readily understood by the skilled person that such steps may be optimised and processed substantially in parallel, where the architecture of the CPUs 208, and the basic instructions set and libraries for same allows.

Figure 6:
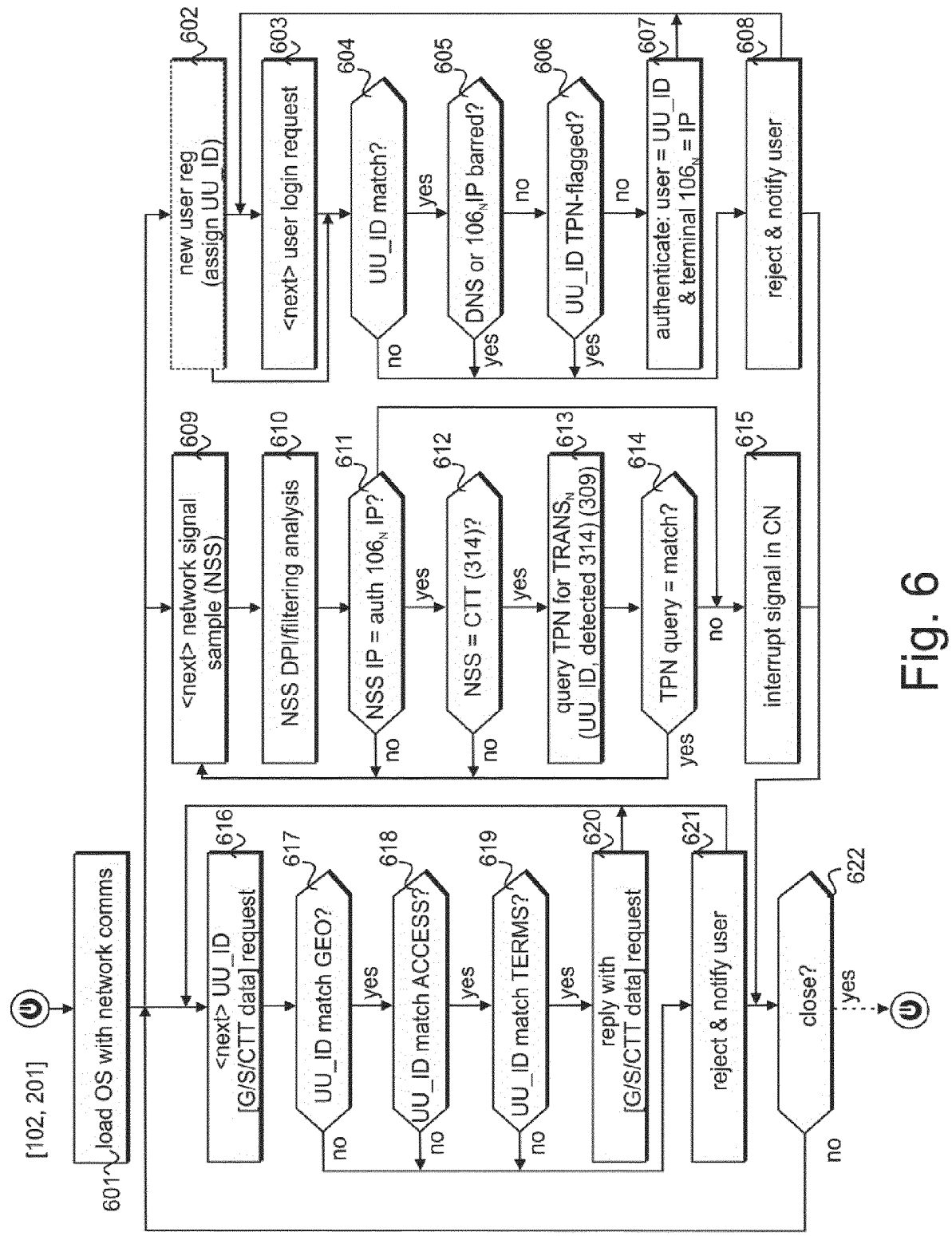
FIG. 6 details data processing steps performed by the core network server in the networked system of FIGS. 1A and 1B according to an embodiment of the present invention.

The data processing steps variously performed by the core network engine 303 and subroutines thereof at the core network server 102 at runtime are shown in FIG. 6. After powering up the core network server 102 conventionally at step 601, the core network application 303 is loaded into the server memory and started locally at step, together with its database 103, and the user interface 305 is instantiated on the display unit of the server 102. The core network server 102 is then ready to process network communications to and from remote nodes in the architecture 100 consisting of the network transaction processing server 105, information exchange server(s) 107, contents server(s) 110 and user terminal(s) 106.

Within each processing cycle of runtime, the core network engine 303 and its subroutines 306, 318 implement three distinct data processing threads processed in parallel, for instance by respective cores of the CPU 208.

In a first thread, at step 602 the core network engine 303 processes any next user registration request for assigning a unique user (UU) identifier 307 to an unregistered requesting user. In the absence of any next buffered new registration request, at a next step 603, the core network engine processes any next user login request for authenticating that user's unique user (UU) identifier.

A question is accordingly asked at step 604, about whether the unique user (UU) identifier of the login request matches the user data and UU identifier stored at 307. If the question of step 604 is answered positively, a next question is asked at step 605, about whether the remote data engine 306 has received any security flag 308 associated with the user or the login request from the user's ISP. If the question of step 605 is answered negatively, a next question is asked at step 606, about whether the remote data engine 306 has received any security flag 309 associated with the UU identifier 307 from the network transaction processing server 105.

If the question of step 606 is answered negatively, then at step 607 the unique user (UU) identifier of the login request is authenticated and uniquely associated with the originating user terminal 106, for instance with a session record of the user terminal's IP address against the UU identifier 307. Alternatively, if the question of step 604 is answered negatively, or the question of step 605 or of step 606 answered positively thereafter, the login request is denied at step 608 and a corresponding denial of service notification is sent to the originating user terminal 106. Control for the thread thereafter returns to step 603, in order to prioritise the processing of user login requests.

In a second thread, at step 609 the network monitoring module 318 receives a sample of, or samples, a network signal transiting within the architecture 100. At step 610, the network monitoring module 318 performs a deep packet inspection and/or equivalent filtering operation upon the sampled network signal, to determine both particulars of its network addressing and the nature of its payload. A question is then asked at step 611, about whether an IP address associated with the sampled signal corresponds to the IP of an authenticated user recorded at a previous instantiation of step 607. If the question of step 611 is answered negatively, the sample signal is not associated with an authenticate user and is of no further interest, whereby control returns to step 609 for receiving a further signal sample or sampling same. If the question of step 611 is answered positively however, a next question is asked at step 612, about whether the payload of the sample signal corresponds to or is representative of digital content as defined at 314 in the database 103. If the question of step 612 is answered negatively, the sampled signal does not contain registered digital content data and is of no further interest, whereby control again returns to step 609. If the question of step 612 is answered positively however, then at step 613 the network monitoring module commands the remote data engine 306 to query the network transaction engine 403 for any successful transaction recorded in its database 411 which associates the registered and logged in user of the user terminal 106 detected at step 611 with the contents data 314 detected at step 612. The reply is received as unique user (UU) data 309 and a corresponding question is asked at step 614, about whether the reply is representative of a matched transaction or of a match failure.

If the question of step 614 is answered positively, the sampled signal is a legitimate signal containing registered content which the user terminal 106 is authorised to receive and/or communicate and is of no further interest, whereby control again returns to step 609. Alternatively, if the question of step 614 is answered negatively, the sampled signal contains registered digital content which the user terminal 106 is not authorised to receive and/or communicate) in the absence of a transaction for same, whether that electronic transaction is for financial consideration or not, e.g. simply a digital consent or signature for nil consideration in respect of copyrighted content made available free for distribution. Accordingly, at a next step 615, the core network engine 303 interrupts the network signal to or from the user terminal 106 detected at step 611, thereby freeing equivalent bandwidth within the architecture 100.

In a third thread, at step 616 the remote data engine 306 processes any next user request for goods, service or digital content data 312, 313, 314 of the contents parameters database 103. A first question is asked at step 617, about whether the geographical data 308 associated with the requesting user terminal 106 of the authenticated user matches the geographical parameter(s) 316 associated with the requested goods, services or digital contents. If the question of step 617 is answered positively, a next question is asked at step 618, about whether the access parameter(s) 308 associated with the authenticated user match the access parameter(s) 315 associated with the requested goods, services or digital contents. If the question of step 618 is answered positively, a next question is asked at step 619, about whether the terms parameter(s) 308 associated with the authenticated user matches the terms parameter(s) 317 associated with the requested goods, services or digital contents.

If the question of step 619 is answered positively, the remote data engine 306 replies to the requesting user terminal 106 at step 620 with the requested goods, service or digital content data 312, 313, 314 of the contents parameters database 103, together with respective terms data 317, wherein the communicated terms data 317 may be further according to the geographic 316 and access rules data 315 relevant to the particulars of the authenticated user location and status. Control for the thread thereafter returns to step 616, in order to prioritise the processing of user data requests.

Alternatively, if the question of step 617 is answered negatively, or the question of step 618 or of step 619 answered negatively thereafter, the data request is denied at step 621 and a corresponding denial of service notification is sent to the originating user terminal 106, then control for the thread again returns to step 616.

Further to each of steps 608, 615 and 621, control also proceeds to a question 622 about whether the operator of the core network server 102 has input a core server engine closing command in the UI 305 or via the OS 301. If the question of step 622 is answered negatively, then the application logic loops across the three threads and control returns to each of steps 602, 609 and 616. Alternatively, the core network engine 304 is unloaded from the memory 208 and the server 102 may eventually be switched off.

Figure 7:
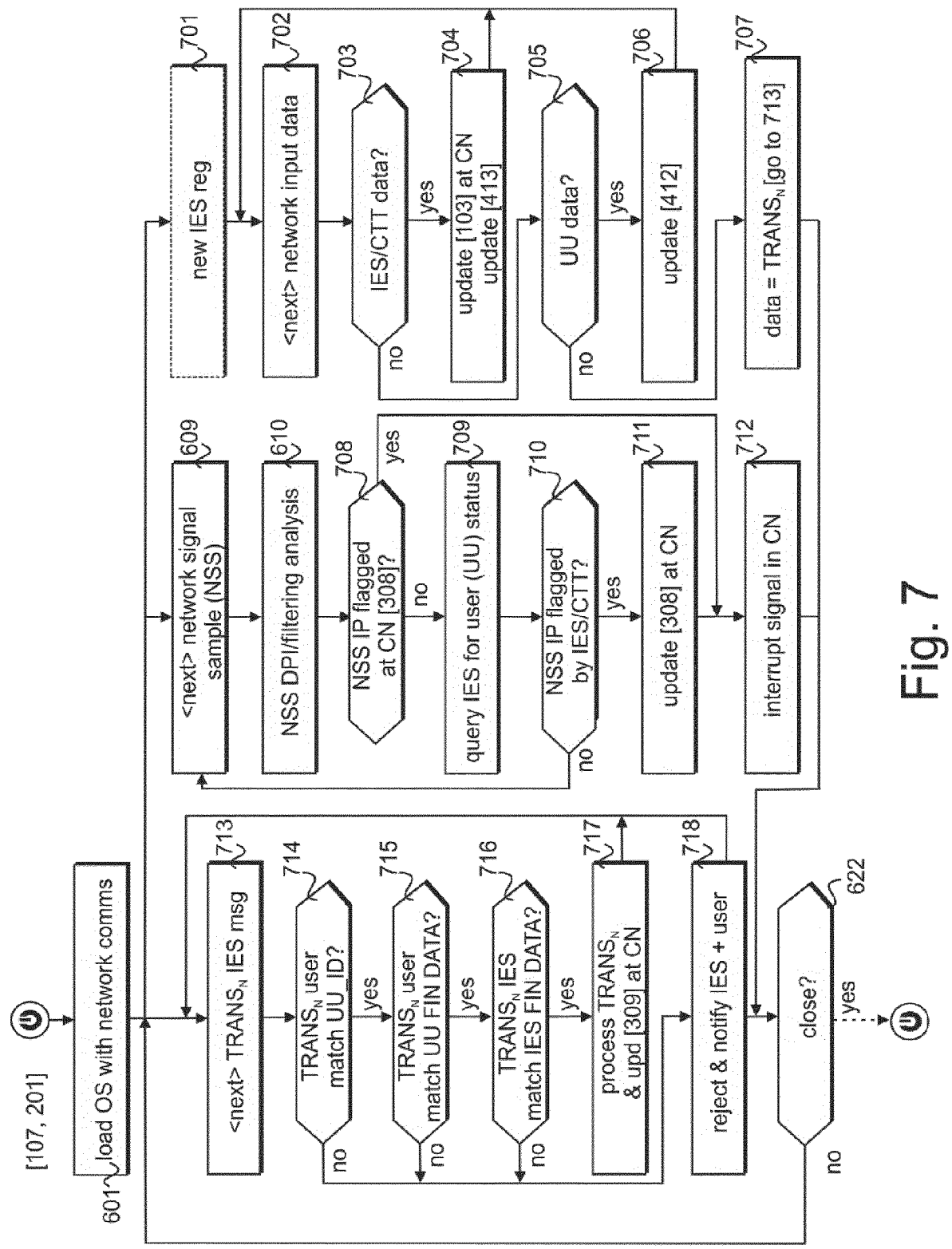
FIG. 7 details data processing steps performed by the network transaction processing server in the networked system of FIGS. 1A and 1B according to an embodiment of the present invention.

The data processing steps variously performed by the network transaction engine 403 and subroutines thereof at the network transaction processing server 105 at runtime are shown in FIG. 7. After powering up the network transaction processing server 105 conventionally at step 601, the network transaction application 403 is loaded into the server memory and started locally, together with its database 411, and the user interface 405 is instantiated on the display unit of the server 105. The network transaction server 105 is then ready to process network communications to and from remote nodes in the architecture 100 consisting of the core network server 102, information exchange server(s) 107, contents server(s) 110 and user terminal(s) 106.

Within each processing cycle of runtime, the network transaction engine 403 and its subroutines 406, 318 again implement three distinct data processing threads processed in parallel, for instance by respective cores of the CPU 208.

In a first thread, at step 701 the network transaction engine 303 processes any next registration request by an information exchange server 107 comprising its respective core registration data 507, which the network transaction engine 303 stores into its database 411 at 413. In the absence of any next registration request, at a next step 702, the network transaction engine processes any next network input data received across the sub-network 104.

A question is accordingly asked at step 703, about whether the network input data comprises goods data, services data, digital contents data, geographical data, access rules data, terms data or processed transactional data 409 communicated by a remote information exchange server 107 or contents server 110. If the question of step 703 is answered positively, for instance if the network input data 409 comprises goods data, services data, digital contents data, geographical data, access rules data or terms data, then at step 704 the network transaction engine 303 forwards the received data to the core network server 102 for processing and updating the contents parameters database 103 therewith; or, if the network input data 409 comprises processed transactional data, the network transaction engine 303 updates the database 411 with same as financial parameters data 413. Control for the thread thereafter returns to step 702, in order to prioritise the processing of network input data.

Alternatively, if the question of step 703 is answered negatively, a next question is asked at step 705, about whether the network input data comprises data 407, 408, 409 communicated by the core network server 102, or a remote information exchange server 107 or contents server 110 in relation to an authenticated user. If the question of step 705 is answered positively, for instance if the network input data comprises a user status update from an information exchange server 107, a new unique user (UU) identifier 307 issued to a newly-registered user by, or a security notice or flag output by the network monitoring module 318 of, the core network server 102, then at step 706 the network transaction engine 303 updates the database 411 with same as unique user data 412. Control for the thread thereafter returns to step 702, in order to prioritise the processing of network input data.

Alternatively, if the question of step 705 is answered negatively, the next network input data is considered to encode an electronic transaction and is passed to the remote data engine 406 for processing at step 707, according to steps 713 to 718 as described hereafter.

In a second thread, at step 609 the network monitoring module 318 receives a sample of, or samples, a network signal transiting within the architecture 100. At step 610, the network monitoring module 318 performs a deep packet inspection and/or equivalent filtering operation upon the sampled network signal, to determine both particulars of its network addressing and the nature of its payload. A question is then asked at step 708, about whether the IP address associated with the sampled signal corresponds to an IP address previously detected by the network monitoring module 318 of the core network server 102 to be associated with illegitimate network traffic according to steps 610 to 615.

If the question of step 708 is answered negatively, at step 709 the network monitoring module 318 commands the remote data engine 406 to query registered information exchange server(s) 107 about the current validity of the user particulars 508 that correspond to the unique user (UU) identifier 307 associated with the detected IP. The reply is received as registered user data 409 and a corresponding question is asked at step 710, about whether the IP address associated with the sampled signal corresponds to a user previously detected by a, or the, or several information exchange server(s) 107 to be associated with illegitimate transactions, false credentials and other security risk(s).

If the question of step 710 is answered negatively, the sampled signal is a signal which does not represent a transactional risk within the architecture 100, and is accordingly of no further interest, whereby control returns to step 609 for receiving a further signal sample or sampling same. If the question of step 710 is answered positively however, then at step 711 the remote data engine 406 communicates a user status update to the core network server 102, at which it is received as data 309, then interrupts the network signal to or from the user terminal 106 at step 712, thereby freeing equivalent bandwidth within the architecture 100. Whenever the question of step 708 is answered positively, control also proceeds directly to step 712.

In a third thread, at step 713 the remote data engine 406 processes any next electronic transaction passed to it by the network transaction engine 403 at step 707. A first question is asked at step 714, about whether the user particulars encoded in the electronic transaction 409 match registered user particulars 412 uniquely associated with the unique user (UU) identifier 307. If the question of step 714 is answered positively, a next question is asked at step 715, about whether the user financial parameter(s) encoded in the electronic transaction 409 match registered financial parameters 412 associated with the unique user (UU) identifier 307. If the question of step 715 is answered positively, a next question is asked at step 716, about whether the financial parameter(s) of the transacting server encoded in the electronic transaction 409 match registered financial parameters 413 of an information exchange server.

If the question of step 716 is answered positively, then at step 717 the remote data engine 406 processes the electronic transaction and communicates a corresponding user status update to the core network server 102, at which it is received as data 309, whereby any respective network signals of the user terminal 106 associated with the processed transaction will continue not be interrupted by the core network server's network monitoring engine. Control for the thread thereafter returns to step 713, in order to prioritise the processing of electronic transactions.

Alternatively, if the question of step 714 is answered negatively, or the question of step 715 or of step 716 answered negatively thereafter, then at step 718 processing of the electronic transaction is interrupted and a corresponding notification is sent to both the originating information exchange server 107 (or contents server 110) and the associated user terminal 106, then control for the thread again returns to step 713.

Further to each of steps 707, 712 and 718, control also proceeds to question 622 as previously described, such that the operation of the network transaction server 105 may either continue normally with the application logic looping across the three threads and control returning to each of steps 701, 609 and 713, or be interrupted for maintenance or other purposes.

Figure 8:
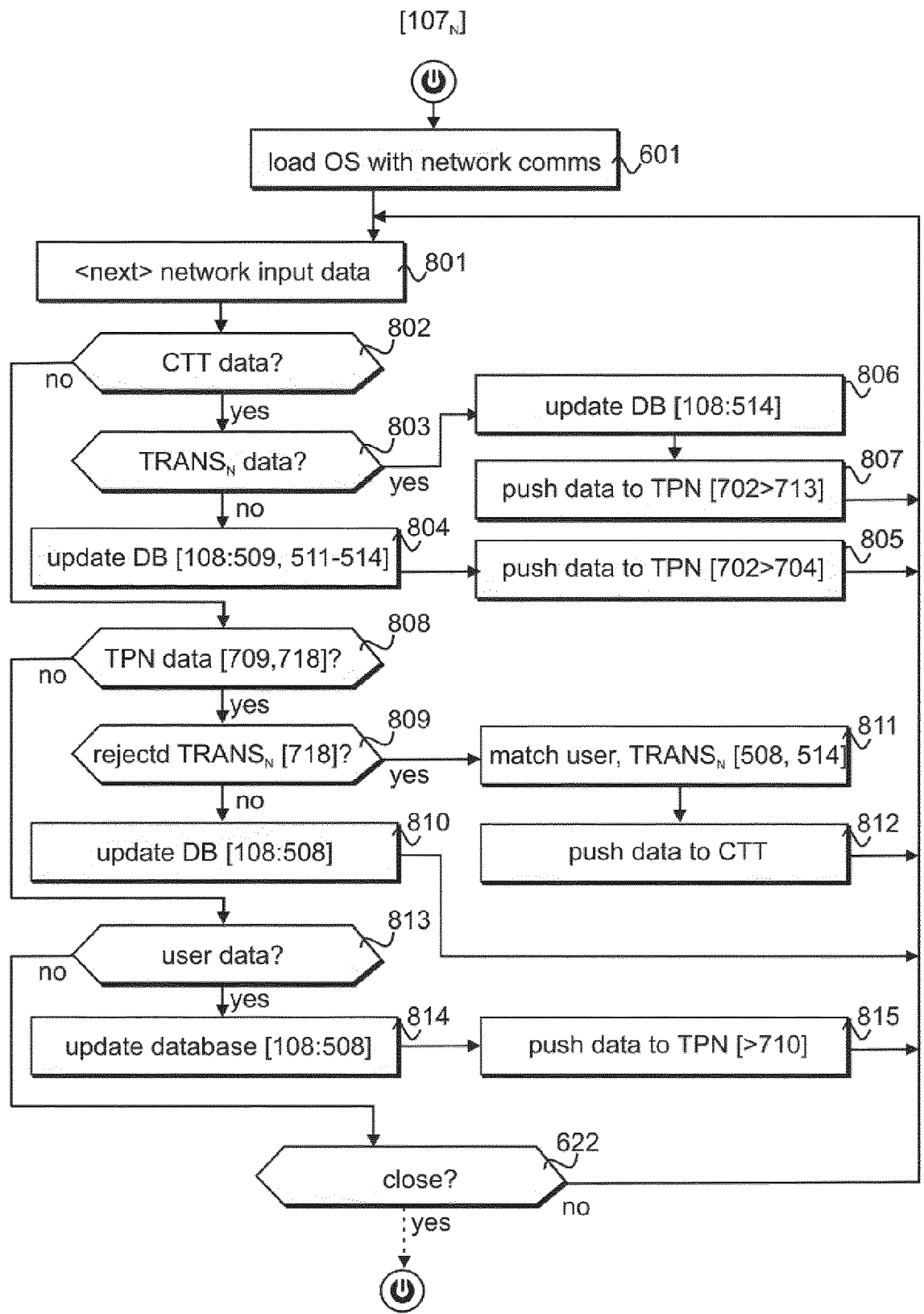
FIG. 8 details data processing steps performed by the information exchange server in the networked system of FIGS. 1A and 1B according to an embodiment of the present invention.

The data processing steps variously performed by the information exchange engine 503 and subroutines thereof at the or each information exchange server 107 at runtime are shown in FIG. 8. After powering up the information exchange server 107 conventionally at step 601, the information exchange application 503 is loaded into the server memory and started locally, together with its database 108, and the user interface 505 is instantiated on the display unit of the server 107. The information exchange server 107 is then ready to process network communications to and from remote nodes in the architecture 100 consisting of the core network server 102, the network transaction processing server 105, contents server(s) 110 and user terminals 106.

At a first step 801, the information exchange engine 503 receives and pre-process any next network input data received across the sub-network 104. A first question is accordingly asked at step 802, about whether the network input data has been communicated by a contents server 110. If the question of step 802 is answered positively, a next question is asked at step 803, about whether the network input data is representative of an electronic transaction.

If the question of step 803 is answered negatively, the network input data communicated by a contents server 110 is for registration purposes and comprises for instance contents server core data, contents server-registered user data, goods data, services data, digital contents data, geographical data, access rules data and/or terms data. Accordingly, at step 804 the information exchange engine 503 updates the database 108 with any or all of the contents server-registered user data 508, contents server core data 509, goods data 510, services data 511, digital contents data 512 and geographical, access rules and/or terms data 513, then at step 805 pushes the database update to the network transaction engine 403 at the network transaction processing server 105 per step 704, such that the database update will eventually be propagated to the contents parameters database 103 at the core network server 102. Control thereafter returns to step 801.

Alternatively, the question of step 803 is answered positively as the network input data communicated by a contents server 110 is representative of an electronic transaction, whether already processed by the contents server 110 or for ulterior processing by the network transaction processing server 105 and encoding at least user particulars, user financial parameter(s) and transacting server financial parameter(s). Accordingly, at step 806 the information exchange engine 503 updates the database 108 with any or all of the user particulars and user and transacting server financial parameters 514, then at step 807 pushes the database update to the remote data engine 406 at the network transaction processing server 105, such that the database update will eventually be propagated to the database 411 and the transaction processed (if not already processed) at step 713. Control thereafter returns to step 801.

Alternatively still, the first question of step 802 is answered negatively, whereby a next question is accordingly asked at step 808, about whether the network input data has been communicated by the network transaction processing server 105. If the question of step 808 is answered positively, a next question is asked at step 809, about whether the network input data is representative of an electronic transaction rejected according to step 718.

If the question of step 809 is answered negatively, the network input data communicated by the network transaction processing server 105 is representative of a status update for the authenticated user within the architecture 100, for instance a network interruption by one or both of the respective network monitoring engines 318 of the core network server 102 and the network transaction processing server 105. Accordingly, at step 810 the information exchange engine 503 updates the database 108 with the updated user data 518, then control returns to step 801.

Alternatively, the question of step 809 is answered positively and, at step 811, the information exchange engine 503 matches the rejected electronic transaction against both the registered user 508 and the stored transaction data 514 in the database 108, then updates the respective statuses of both matched user 508 and transaction 514. At step 812, the information exchange engine 503 matches the stored transaction 514 with the contents server 110 that originated it per steps 802, 803 and a corresponding notification is sent to at least the matched contents server 110 such that goods, services and/or digital contents that are the subject of the rejected electronic transaction are not supplied. Control thereafter returns to step 801.

Alternatively still, the question of step 808 is answered negatively, whereby a further question is asked at step 813, about whether the network input data has been communicated by an ISP, MSP or other third party and includes user status data, for instance terminal location or user security flag. If the question of step 813 is answered positively, then at step 814 the information exchange engine 503 matches the user status data against registered users 508 in the database 108, then updates the respective status of the matched user 508. At step 815, the information exchange engine 503 pushes the database update to the remote data engine 406 at the network transaction processing server 105, such that the database update will eventually be propagated to both network monitoring modules 318. Control thereafter returns to step 801.

Alternatively, the question of step 813 is answered negatively instead, and a final question is asked at step 622 as previously described, such that the operation of the information exchange server 107 may either continue normally with the application logic looping back to step 801, or be interrupted for maintenance or other purposes.

Figure 9:
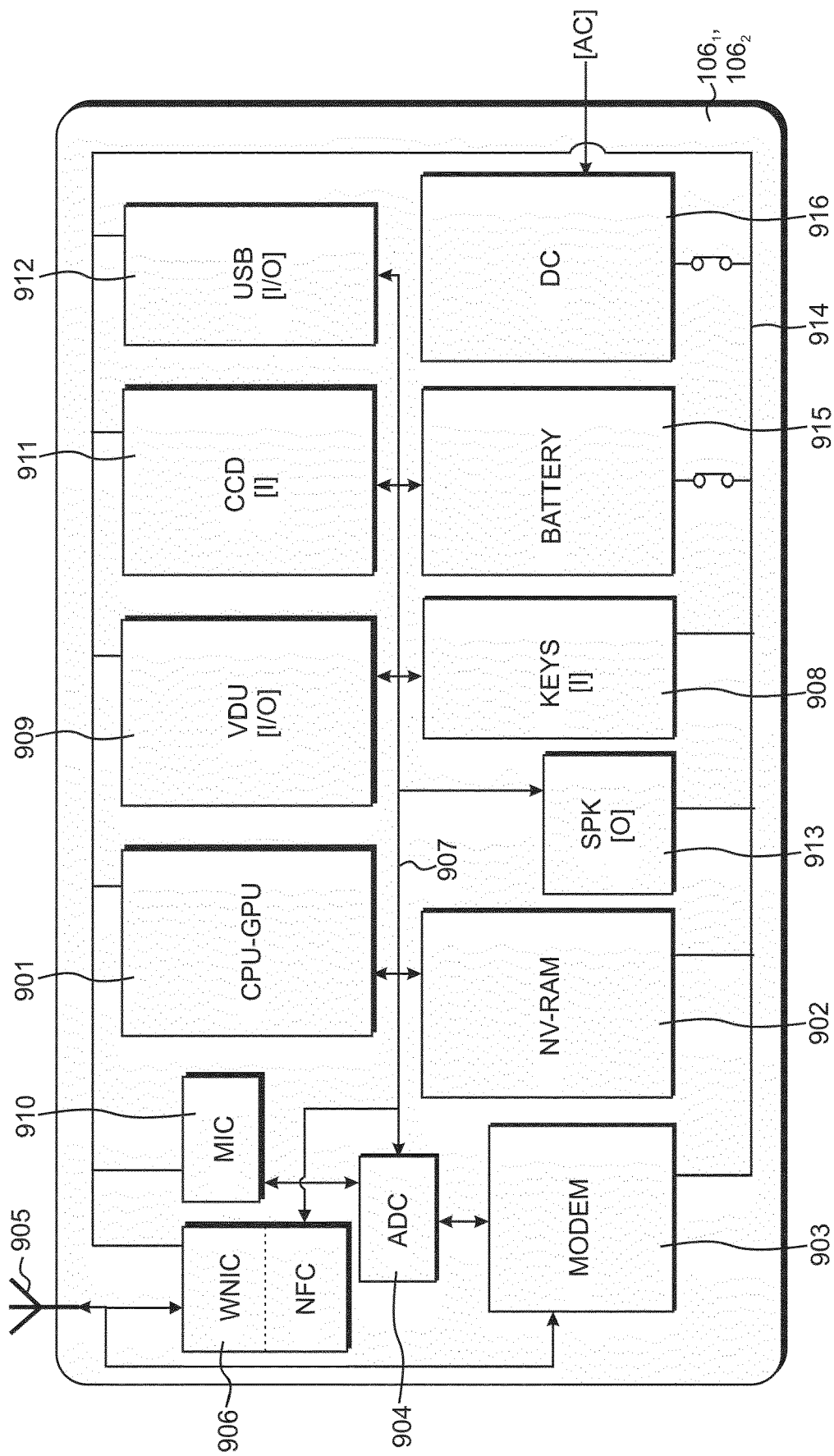
FIG. 9 illustrates a typical hardware structure of a data processing user terminal shown in FIGS. 1A and 1B.

In use, a user operating a user terminal 106 initially interfaces with the network architecture 100 via their ISP or MSP. A typical hardware architecture of the user terminals 106₁, 106₂ is shown in FIG. 9 in further detail, by way of non-limitative example. As skilled persons will readily understand, the hardware architecture of the tablet computer 106₂ is substantially similar to that of the smartphone 106₁ described herein, for purposes of ergonomic handling and miniaturisation.

The smartphone 106₁ thus firstly includes a data processing unit 901, for instance a general-purpose microprocessor, for instance conforming to the Cortex™ architecture manufactured by ARM™, acting as the main controller of the data processing terminal 106₁ and which is coupled with memory means 902, comprising volatile random-access memory (RAM), non-volatile random-access memory (NVRAM) or a combination thereof.

The user terminal 106₁ further includes networking means. Communication functionality in the smartphone 106₁ is provided by a modem 903, which provides the interface to external communication systems, such as the GPRS, 3G or 4G cellular telephone network shown in FIG. 1B, associated with or containing an analogue-to-digital converter 904, which receives an analogue waveform signal through an aerial 905 from the communication link relay 138 and processes same into digital data with the data processing unit 901 or a dedicated signal processing unit. Alternative wireless communication functionality is provided by a wireless network interface card (WNIC) 906 interfacing the smartphone 106₁ with the wireless local area network generated by the local wireless router 131. Further alternative wireless communication functionality may be provided by a High Frequency Radio Frequency Identification (RFID) networking interface implementing Near Field Communication (NFC) interoperability and data communication protocols for facilitating wireless data communication over a short distance with correspondingly-equipped devices such as the tablet computer 106₂ and others, for instance an NFC-enabled payment card of the device user.

The CPU 901, NVRAM 902 and networking means 903 to 906 are connected by a data input/output bus 907, over which they communicate and to which further components of the smartphone 106₁ are similarly connected in order to provide wireless communication functionality and receive user interrupts, inputs and configuration data. Accordingly, user input may be received from a data input interface 908, which for smartphone 106₁ is a keypad with a limited number of multi-functional keys and/or a capacitive or resistive touch screen feature of the display unit 909. Further input data may be received as analogue sound wave data by a microphone 910, digital image data by a digital camera lens 911 and digital data via a Universal Serial Bus (USB) 912. Processed data is output as one or both of display data output to the display unit 909 and audio data output to a speaker unit 913.

Power is supplied to the above components by the electrical circuit 914 of the device 106₁, which is interfaced with an internal battery module 915, which itself may be recharged on an ad hoc basis by an electrical converter 916.

Figure 10:
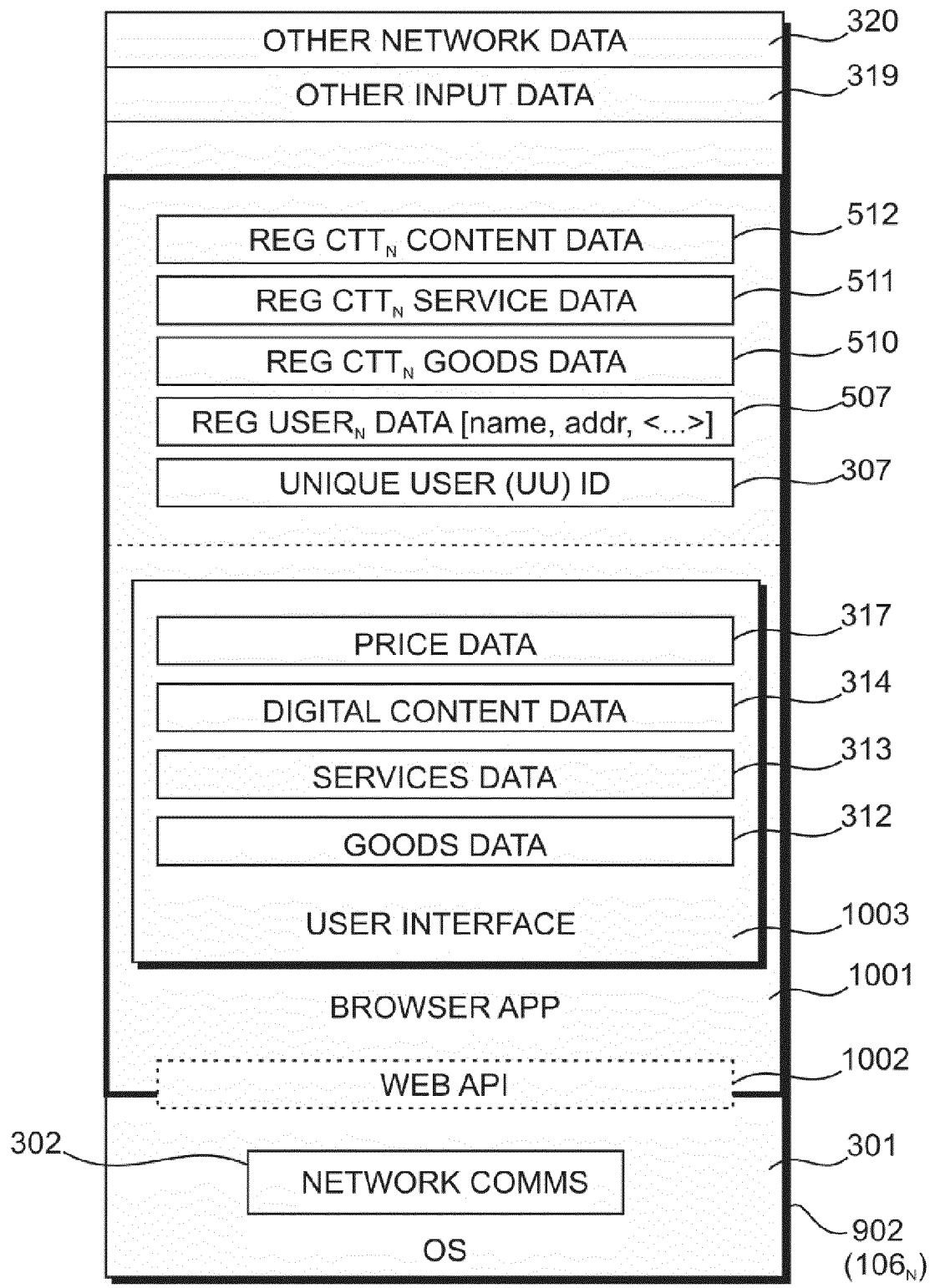
FIG. 10 illustrates the memory contents of the user terminal at runtime, including an operating system and a browser application.

With reference to FIG. 10, each user terminal 106$_N$ is configured with at least an operating system 301 which, if the user terminal 106 is for instance an iPhone® mobile phone handset or an iPad® tablet computer manufactured by Apple® Inc. of Sunnyvale, USA, is iOS® likewise distributed by Apple® Inc. or, if the user terminal 106 is for instance an Galaxy® mobile phone handset manufactured by Samsung® Electronics Co., Ltd of Suwon, Republic of Korea, is Android® distributed by Google® Inc.

The OS 301 again includes communication subroutines 302 to configure the user terminal 106 for bilateral network data communication within the architecture 100 via the modem 903 and the NIC 906. The OS 301 also includes input subroutines for reading and processing input data variously consisting of user direct input to the keypad 908 and to the touchscreen interface 909, image data captured by the CCD 911 and audio data supplied by the DAC 904 after processing input from the microphone 910.

Figure 11:
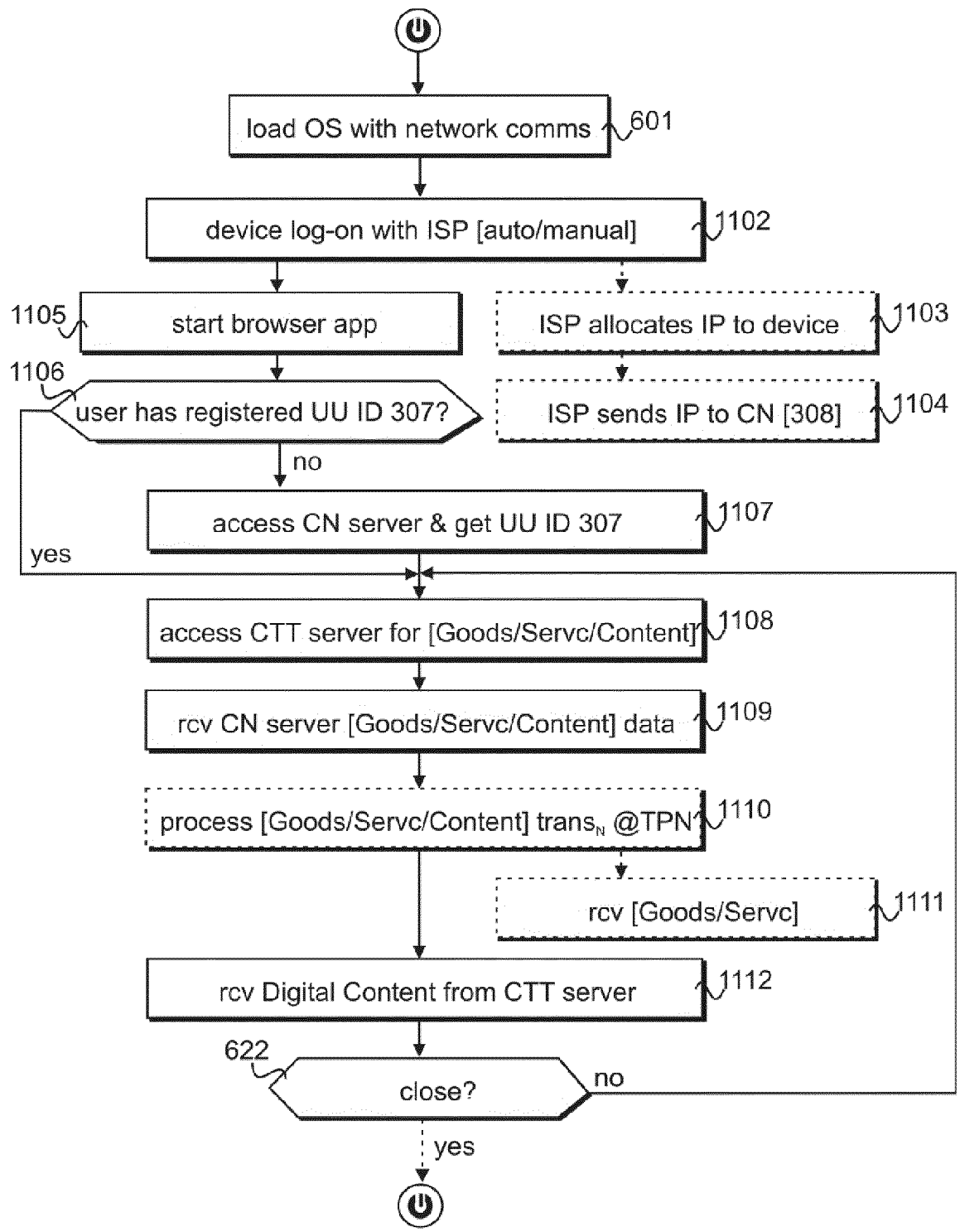
FIG. 11 illustrates a variety of network transactions between servers and terminals in the environment of FIGS. 1A and 1B according to the combination of data processing steps of FIGS. 8 to 10.

A browser application is shown at 1001 residing in the memory 902 at runtime, which configures the user terminal 106 to perform data processing steps described hereafter with reference to FIG. 11. The browser 1001 is interfaced with the OS 301, particularly the network communication subroutine 302 of the OS 301, via one or more suitable Application Programmer Interfaces 1002. A user interface of the browser 1001 is shown at 1003 which is updated and output to the display 909 in real time.

In use, when the user accesses the WAN 120, the user terminal 106 is logged on by the user's ISP using the user's credentials data 507 and the user terminal 106 is next assigned its respective unique user (UU) identifier 307 at the core network server 102. When the user requires goods, services or digital contents, the user may access representative data 510, 510, 512 thereof at a relevant contents server 110. If the contents server 110 is registered with the information and exchanger server 107, however, the browser application 1001 downloads representative goods data 312, services data 313 or digital contents data 314 with associated terms data 317 from the contents parameters database 103 at the core network server 102, which is rendered as a webpage or similar data construct into the user interface 1003.

Further local data 319 and network data 320 may again be stored in the memory means 909 of the user terminal 106 at runtime, some or all of which may be processed either by the browser application 1001 and any sub-routines thereof, or by or for other application(s) being processed in parallel with the said browser application. An example of further local data is for instance local user input 319 read by the OS 301 in real time from components 908, 909 but which user input lies outside the user interface 1003 of the browser application 1001. An example of further network data 320 is for instance remote application or OS updating data 320 communicated by a remote server over the WAN 120.

With reference to FIG. 11 now, the data processing steps variously performed at the user terminal 106 at runtime are shown in FIG. 11. After powering up the terminal 106 conventionally at step 1101, the terminal is automatically or manually logged in to the WAN 120 through an ISP or MSP at step 1102. Independently of the user terminal 106, at step 1103 the ISP assigns an IP address to the user terminal 106 dynamically from within a pool of IP addresses reserved for its subscribers and communicates this IP address to the remote data engine 306 of the core network server 102 at step 1104, at which it is received as status data 308.

The user of user terminal 106 may start the browser application 1001, or an app with equivalent functionality as described hereafter, at any given time for gaining access to goods, services or digital contents data, at step 1105. A question is then asked at step 1106, about whether the user is already registered within the network architecture 100. If the question of step 1106 is answered negatively, then at step 1107 the user terminal 106 is redirected to the core network server 102 for obtaining a respective unique user (UU) identifier 307 and authentication as previously described. Alternatively, the user is already registered within the network architecture 100 and is authenticated with a respective unique user (UU) identifier 307. Further to completing authentication, at step 1108 the user terminal 106 is then allowed to request data 312, 313, 314 representative of the goods, services and digital contents of interest from a relevant contents server 110 interfaced with the network architecture 100 through a respective information exchange server 107. The core network server 102 filters data requests from and replies to the user terminal 106 according to the access rules 315, geographical data 316 and terms data 317 recorded against each good, service and content data in the contents parameters database 103 such that, at step 1109, the browser 1001 at the user terminal 106 only receives data 312, 313, 314 representative of goods, services and digital content for which the user terminal 106 and/or the user meet all of the respective access, geographical and term parameters.

The user may then effect ordering or other transactional inputs through the browser 1001 according to convention techniques, which the network transaction processing server 105 processes subsequently at step 1110 as previously described, whereby the user eventually takes delivery of the goods or services at step 1111 or the user terminal 106 eventually receives the digital contents from the contents server 110. Control then proceeds to question 622 as previously described, such that the operation of the user terminal 106 may either continue normally with the application logic returning to step 1108, or be interrupted for economy of battery, maintenance or other purposes.

Figure 12:
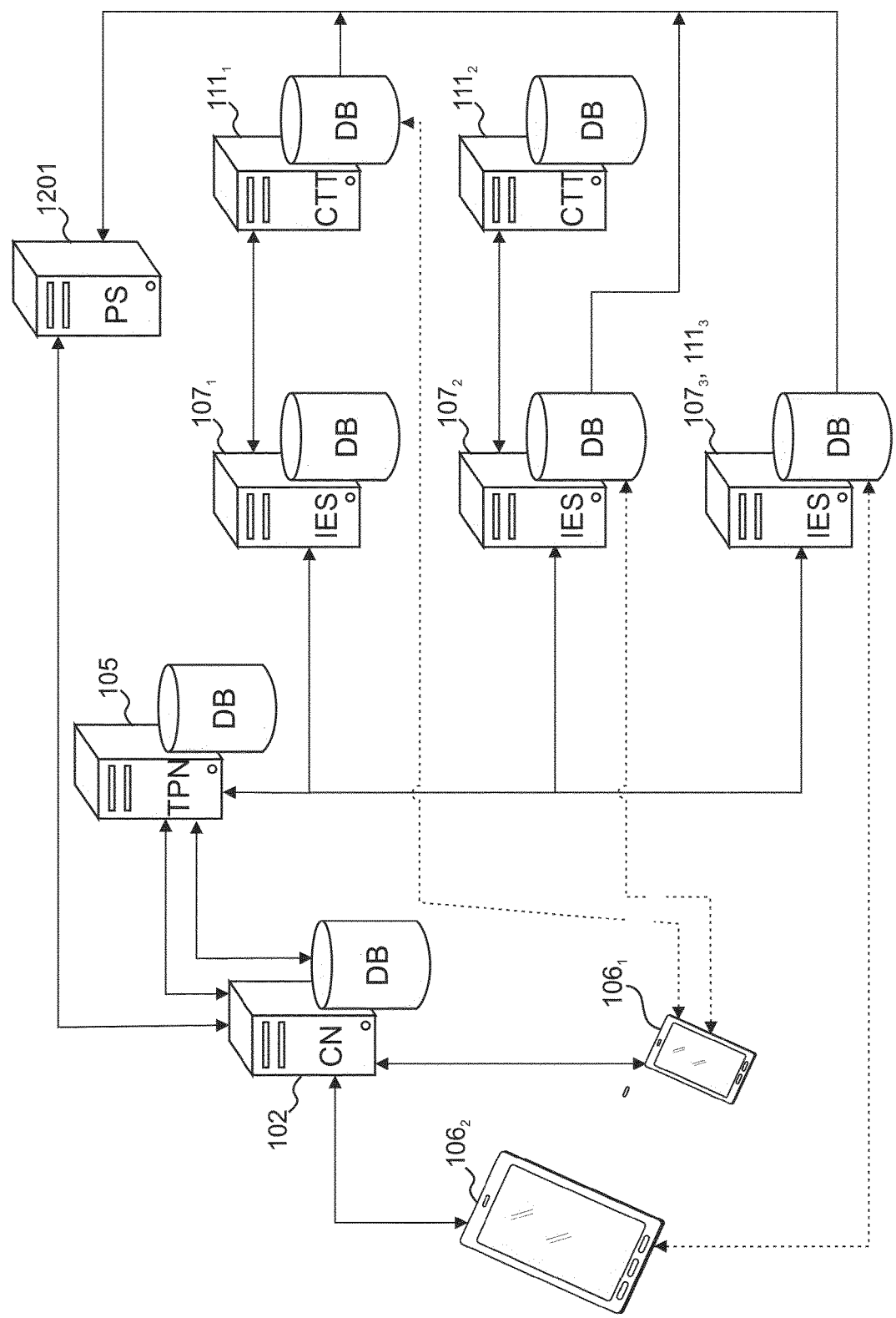
FIG. 12 is a logic representation of a network architecture according to a second embodiment of the present invention, wherein the environment of FIG. 1A further comprises a payment server (PS) operably connected to the core network (CN) server.

An alternative embodiment of the network architecture 100 is shown in FIG. 12, wherein a further node, namely a payment server 1201, is operably connected to the architecture 100 across the sub-network 104.

In this embodiment, the payment server 1201 is a node wherein some or all electronic transactions are registered and processed according to conventional secure data processing techniques, which is in data communication with the core network node 102 and the or each information exchange server 107, each of which are adapted to command the payment server to execute electronic payments for any user with an authenticated unique user (UU) identifier 307.

The payment server 1201 is configured by a fourth server application to first authenticate, for each electronic transaction, the user whose particulars are associated with that electronic transaction, at the core network server 102. The payment server 1201 relies primarily on the remote data engine 306 of the core network server 102 for authenticating users through their UU identifier 307, but can redundantly rely upon the user particulars 508 registered at information exchange server(s) 107 if the user is not authenticated by the core network server 102, for instance in case the core network server 102 or its respective data is temporarily offline.

The invention advantageously implements a network architecture, wherein registration of users operating user terminals and devices 106 at the core network node 102 in the database 103 provides a unique identification address or number or account 307 for each terminal device 106 and each information exchange server 107, such that WAN signals transiting within the architecture 100 are actively monitored and managed by the core network 102 and the network transaction processing server 105, on the basis of any one or more of geographical location of the user or terminal 106, content of the signals, denial of service notifications from both ISPs and goods, services and content providers.

The invention therefore implements a network architecture, described herein as combining a first server 102 embodying at least a first core node, a second server 105 embodying a transaction processing node of a sub-network within the core network defined by the first node, and one or more information exchange servers 107 interfacing networked electronic goods, services and content providers with the core network and sub-network 104, into a single network resource for users operating connected user terminals $106_N$. Skilled readers will readily appreciate however, that the network architecture of the invention may be partially or even fully virtualized, with fewer physical servers embodying the respective nodes of the architecture described herein.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A network architecture for controlling network data signalling in a network, comprising:
    at least one core network having at least a first node storing a database of contents and network communication parameters which comprises access rules for users of data processing terminals and devices connected to the network,
    wherein the database of contents and network communication parameters stores data related to use of contents data on the network or communication options for one or more users on the network, and wherein the first node is adapted to communicate at least the data related to use of the contents data on the network or the communication options for one or more users on the network;
    at least one sub-network operably interfaced with the core network, having at least a network transaction processing node;
    wherein each of the first node and the network transaction processing node is adapted to authenticate all users of data processing terminals and devices connected to the network for access to the network or predetermined parts of the network and to allow, block and monitor the network signals of users and devices based on the database of contents and network communication parameters;
    at least one information exchange server operably interfaced with the sub-network and storing a registration and communication database having respective unique identifier(s) of each of the one or more network users recorded therein;
    wherein access by network-connected data processing terminals to other data processing terminals, devices and contents data on the network is controlled by the first node or the network transaction processing node according to predetermined criteria recorded in the database of contents and network communication parameters or in the registration and communication database; and wherein the predetermined criteria are updated by each of the first node, the network transaction processing node and the information exchange server.

2. The network architecture according to claim 1, wherein the first node is further adapted to detect contents data in network signals and communication of data processing terminals connected to the network and to interrupt the detected network traffic.

3. The network architecture according to claim 1, wherein the network transaction processing node is further adapted to detect contents data in network signals of data processing terminals connected to the network operated without authentication and to interrupt the detected network traffic.

4. The network architecture according to claim 1, wherein the at least one sub-network further comprises at least one payment node adapted to check for user authentication with at least the first node and to register and process electronic payments according to the authentication.

5. The network architecture according to claim 1, wherein the information exchange server is adapted to receive data representative of the contents data, data representative of a value of the contents data and the predetermined access criteria from one or more contents servers, to receive the unique identifier(s) from each network user and to send data representative of network transactions from the network transaction processing node.

6. The network architecture according to claim 5, wherein the network architecture is a virtualized network architecture combining at least the first node, network transaction processing node and the information exchange server into a single network resource.

7. A method of controlling network data signalling in a network, wherein the network comprises at least one core network having at least a first node, at least one sub-network operably interfaced with the core network, having at least a network transaction processing node, and at least one information exchange server and at least one contents server each operably interfaced with the sub-network, and wherein the method comprises:
storing a database of contents and network communication parameters at the first node, the database comprising access rules for users of data processing terminals and devices connected to the network, wherein the database of contents and network communication parameters stores data related to use of contents data on the network or communication options for one or more users on the network, and wherein the first node is configured to communicate the data related to the use of contents data on the network or the communication options for one or more users on the network;
authenticating all users of data processing terminals connected to the network with the first node and the network transaction processing node for access to the network or predetermined parts of the network;
allowing, blocking and monitoring respective network signals of data processing terminals connected to the network based on the database of contents and network communication parameters;
storing a registration and communication database having respective unique identifier(s) of each of the one or more network users recorded therein at the information exchange server;
controlling access by network-connected data processing terminals to other data processing terminals and devices and contents data on the network by the first node or the network transaction processing node according to predetermined criteria recorded in the database of contents and network communication parameters or in the registration and communication database; and
updating the predetermined criteria by each of the first node, the network transaction processing node and the information exchange server.

8. The method according to claim 7, further comprising detecting contents data in network signals and communication of data processing terminals connected to the network and interrupting the detected network traffic.

9. The method according to claim 8, wherein detecting contents data and interrupting the detected network traffic are performed by the first node, the network transaction processing node or both nodes in cooperation.

10. The method according to claim 7, wherein the at least one sub-network further comprises at least one payment node, and wherein the method further comprises checking for user authentication with the first node and registering and processing electronic payments according to the authentication with the payment node.

11. The method according to claim 7, further comprising receiving, at the information exchange server, data representative of the contents data, data representative of a value of the contents data and the predetermined access criteria from the or each one or more contents servers, receiving the unique identifier(s) from each network user and sending data representative of network transactions from the network transaction processing node.

* * * * *